(12) United States Patent
Katsuda et al.

(10) Patent No.: US 7,999,217 B2
(45) Date of Patent: Aug. 16, 2011

(54) IMAGE-CAPTURING ELEMENT INCLUDING PHOTOELECTRIC CONVERSION CELLS THAT PUPIL-DIVIDE OBJECT LIGHT AND OUTPUT A RANGING SIGNAL

(75) Inventors: Yasutoshi Katsuda, Osaka (JP); Genta Yagyu, Hyogo (JP); Shinichi Fujii, Osaka (JP)

(73) Assignee: Sony Corporation, Tokyo (JP)

( * ) Notice: Subject to any disclaimer, the term of this patent is extended or adjusted under 35 U.S.C. 154(b) by 276 days.

(21) Appl. No.: 12/272,294

(22) Filed: Nov. 17, 2008

(65) Prior Publication Data

US 2009/0146046 A1  Jun. 11, 2009

(30) Foreign Application Priority Data

Dec. 11, 2007  (JP) .................. 2007-319665

(51) Int. Cl.
*H01J 3/14* (2006.01)
*G01J 1/04* (2006.01)
(52) U.S. Cl. .................... 250/216; 250/237 R
(58) Field of Classification Search .............. 250/208.1, 250/201.8, 201.2, 201.5, 201.4, 237 R, 239, 250/214 R, 214.1, 216; 396/89, 111, 113, 396/115, 119, 121, 138, 139, 276; 348/272–281, 348/294, 302, 335, 345, 348, 349; 257/257, 257/258, 290, 291, 294, 428, 431, 432–437; 359/232, 233, 229
See application file for complete search history.

(56) References Cited

U.S. PATENT DOCUMENTS

| 6,308,015 | B1* | 10/2001 | Matsumoto | 396/106 |
| 7,355,154 | B2* | 4/2008 | Washisu | 250/201.2 |
| 7,711,260 | B2* | 5/2010 | Ide et al. | 396/91 |
| 2002/0025156 | A1* | 2/2002 | Kuwata et al. | 396/114 |
| 2005/0253943 | A1* | 11/2005 | Takahashi et al. | 348/294 |

FOREIGN PATENT DOCUMENTS

JP  2000-156823  6/2000

* cited by examiner

*Primary Examiner* — Georgia Y Epps
*Assistant Examiner* — Jennifer Bennett
(74) *Attorney, Agent, or Firm* — Oblon, Spivak, McClelland, Maier & Neustadt, L.L.P.

(57) ABSTRACT

An image-capturing element includes a pair of photoelectric conversion cells that pupil-divide object light in a first direction and in a second direction and that output a ranging signal. The photoelectric conversion cells include a photoreceiving element configured to receive the object light and generate a ranging signal, a first light-shielding layer having a first light-transmitting area, and a second light-shielding layer having a second light-transmitting area. The photoelectric conversion cells include a first photoelectric conversion cell in which the first light-transmitting area is offset in the first direction on the first light-shielding layer and the second light-transmitting area is offset in the second direction on the second light-shielding layer, and a second photoelectric conversion cell in which the first light-transmitting area is offset in the second direction on the first light-shielding layer and the second light-transmitting area is offset in the first direction on the second light-shielding layer.

8 Claims, 15 Drawing Sheets

IMAGE-CAPTURING ELEMENT INCLUDING PHOTOELECTRIC CONVERSION CELLS THAT PUPIL-DIVIDE OBJECT LIGHT AND OUTPUT A RANGING SIGNAL

CROSS REFERENCES TO RELATED APPLICATIONS

The present invention contains subject matter related to Japanese Patent Application JP 2007-319665 filed in the Japanese Patent Office on Dec. 11, 2007, the entire contents of which are incorporated herein by reference.

BACKGROUND OF THE INVENTION

1. Field of the Invention

The present invention relates to an image-capturing element having a focus detection function and to a technology related to the image-capturing element.

2. Description of the Related Art

A technology in which a focus detection function using a phase-difference detection method is incorporated in an image-capturing element (solid-state image-capturing element) exists.

For example, in an image-capturing element disclosed in Japanese Unexamined Patent Application Publication No. 2000-156823, a plurality of photoreceiving elements and a plurality of microlenses are provided, with each microlens being arranged on the incidence side of a corresponding photoreceiving element. A plurality of photoreceiving elements include photoreceiving elements for image capturing and photoreceiving elements for phase-difference detection, both types of photoreceiving elements being arranged on the same arrangement surface (plane).

The photoreceiving element for phase-difference detection is provided with a light-shielding film (light-shielding plate) having an opening offset in a predetermined direction between a microlens and a photoreceiving element, so that object light from a predetermined direction in which light is to be received with regard to pupil division is received by the photoreceiving element.

SUMMARY OF THE INVENTION

In the above-described image-capturing element of the related art, since the number of light-shielding plates having an opening is one, not only object light that enters from a predetermined direction, but also object light that enters from a direction opposite to the predetermined direction passes through the opening. Therefore, there are cases in which object light from the direction opposite to the predetermined direction is received by the photoreceiving element. In such cases, focus detection accuracy is decreased.

Accordingly, it is desirable to provide a technology capable of suppressing object light from a direction opposite to a predetermined direction with regard to pupil division from being received by a photoreceiving element and improving focus detection accuracy in an image-capturing element incorporating a focus detection function.

According to an embodiment of the present invention, there is provided an image-capturing element including: a pair of photoelectric conversion cells that pupil-divide object light in a first direction and in a second direction, the first direction and the second direction being different from each other, and that output a ranging signal, wherein each of the pair of photoelectric conversion cells includes a photoreceiving element configured to receive the object light and generate a ranging signal, a first light-shielding layer having a first light-transmitting area, the first light-shielding layer being arranged above the photoreceiving element, and a second light-shielding layer having a second light-transmitting area, the second light-shielding layer being arranged between the photoreceiving element and the first light-shielding layer, and wherein the pair of photoelectric conversion cells includes a first photoelectric conversion cell in which the first light-transmitting area is offset in the first direction on the first light-shielding layer and the second light-transmitting area is offset in the second direction on the second light-shielding layer, and a second photoelectric conversion cell in which the first light-transmitting area is offset in the second direction on the first light-shielding layer and the second light-transmitting area is offset in the first direction on the second light-shielding layer.

According to another embodiment of the present invention, there is provided an image-capturing element including: a pair of photoelectric conversion cells that pupil-divide object light in a first direction and in a second direction, the first direction and the second direction being different from each other, and that output a ranging signal, wherein each of the pair of photoelectric conversion cells includes a photoreceiving element configured to receive the object light and generate a ranging signal; a first light-shielding layer having a first light-transmitting area, the first light-shielding layer being arranged above the photoreceiving element; a second light-shielding layer arranged between the photoreceiving element and the first light-shielding layer, and wherein the pair of photoelectric conversion cells includes a first photoelectric conversion cell in which the first light-transmitting area is offset in the first direction on the first light-shielding layer, and the second light-shielding layer is arranged at a position at which, when a light beam perpendicular to a photoreceiving surface of the image-capturing element is emitted to the first light-shielding layer, light of the light beam that has been transmitted through the first light-transmitting area is shielded, and a second photoelectric conversion cell in which the first light-transmitting area is offset in the second direction on the first light-shielding layer, and the second light-shielding layer is arranged at a position at which, when a light beam perpendicular to the photoreceiving surface is emitted to the first light-shielding layer, light of the light beam that has been transmitted through the first light transparent area is shielded.

According to another embodiment of the present invention, there is provided an image-capturing apparatus including: an image-capturing element, wherein the image-capturing element includes a pair of photoelectric conversion cells that pupil-divide object light in a first direction and in a second direction, the first direction and the second direction being different from each other, and that output a ranging signal, and wherein each of the pair of photoelectric conversion cells includes a photoreceiving element configured to receive the object light and generate a ranging signal, a first light-shielding layer having a first light-transmitting area, the first light-shielding layer being arranged above the photoreceiving element, and a second light-shielding layer having a second light-transmitting area, the second light-shielding layer being arranged between the photoreceiving element and the first light-shielding layer, and wherein the pair of photoelectric conversion cells includes a first photoelectric conversion cell in which the first light-transmitting area is offset in the first direction on the first light-shielding layer, and the second light-transmitting area is offset in the second direction on the second light-shielding layer, and a second photoelectric conversion cell in which the first light-transmitting area is offset in the second direction on the first light-shielding layer and the second light-transmitting area is offset in the first direction on the second light-shielding layer.

According to another embodiment of the present invention, there is provided an image-capturing apparatus including: an image-capturing element, wherein the image-capturing element includes a pair of photoelectric conversion cells that pupil-divide object light in a first direction and in a second direction, the first direction and the second direction being different from each other, and that output a ranging signal, wherein each of the pair of photoelectric conversion cells includes a photoreceiving element configured to receive the object light and generate a ranging signal, a first light-shielding layer having a first light-transmitting area, the first light-shielding layer being arranged above the photoreceiving element; a second light-shielding layer having a second light-transmitting area, the second light-shielding layer being arranged between the photoreceiving element and the first light-shielding layer, and wherein the pair of photoelectric conversion cells includes a first photoelectric conversion cell in which the first light-transmitting area is offset in the first direction on the first light-shielding layer, and the second light-shielding layer is arranged at a position at which, when a light beam perpendicular to a photoreceiving surface of the image-capturing element is emitted to the first light-shielding layer, light of the light beam that has been transmitted the first light-transmitting area is shielded, and a second photoelectric conversion cell in which the first light-transmitting area is offset in the second direction on the first light-shielding layer, and the second light-shielding layer is arranged at a position at which, when a light beam perpendicular to the photoreceiving surface is emitted to the first light-shielding layer, light of the light beam that has been transmitted the first light-transmitting area is shielded.

According to the embodiments of the present invention, since object light from a direction opposite to a direction in which light is to be received is shielded by the second light-shielding layer, it is possible to suppress the object light from being received by a photoreceiving element and possible to improve focus detection accuracy.

DESCRIPTION OF THE PREFERRED EMBODIMENTS

First Embodiment

Exterior Configuration of Image-Capturing Apparatus 1A

Figure 1:
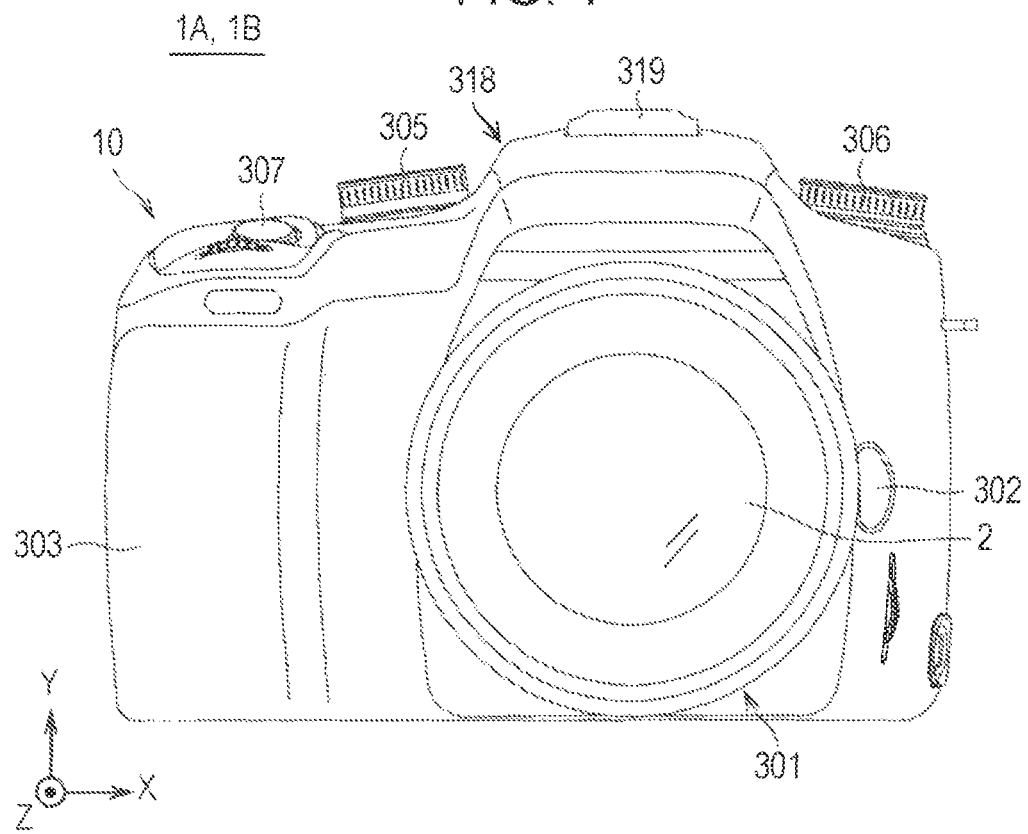
FIG. 1 shows the exterior configuration of an image-capturing apparatus according to a first embodiment of the present invention.
Figure 2:
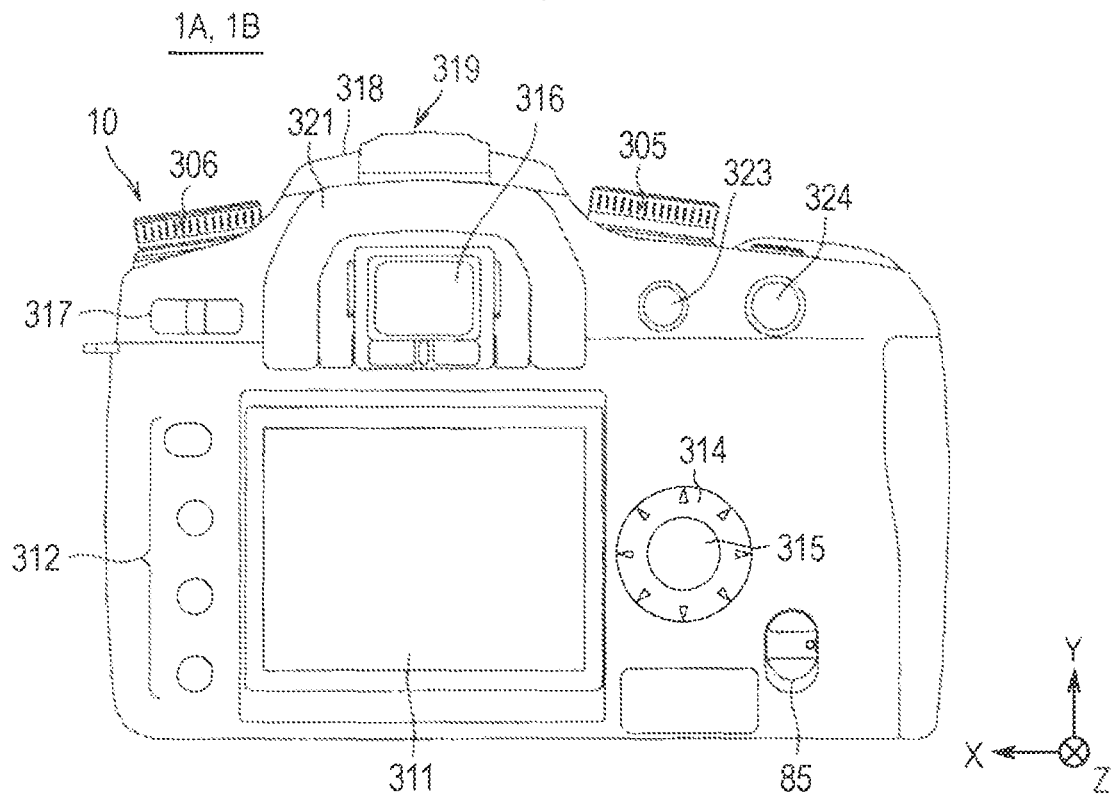
FIG. 2 shows the exterior configuration of the image-capturing apparatus according to the first embodiment of the present invention.

FIGS. 1 and 2 show the exterior configuration of an image-capturing apparatus 1A according to a first embodiment of the present invention. Here, FIGS. 1 and 2 show a front view and a back view, respectively.

The image-capturing apparatus 1A is configured as, for example, a single-lens reflex digital still camera, and includes a camera body 10, and an interchangeable lens 2 serving as an image-capturing lens that can be attached to and detached from the camera body 10.

More specifically, as shown in FIG. 1, provided on the front side of the camera body 10 are a mount unit 301 in which the interchangeable lens 2 is mounted in substantially the center of the front; a lens release button 302 arranged to the right of the mount unit 301; a grip unit 303 with which gripping is possible; a mode setting dial 305 arranged in the upper left area of the front; a control value setting dial 306 arranged in the upper right area of the front; and a shutter button 307 arranged on the top surface of the grip unit 303.

The interchangeable lens 2 functions as a lens window for receiving light (object light) from an object and also functions as an image-capturing optical system for guiding object light to an image-capturing element 101 arranged inside the camera body 10.

Figure 5:
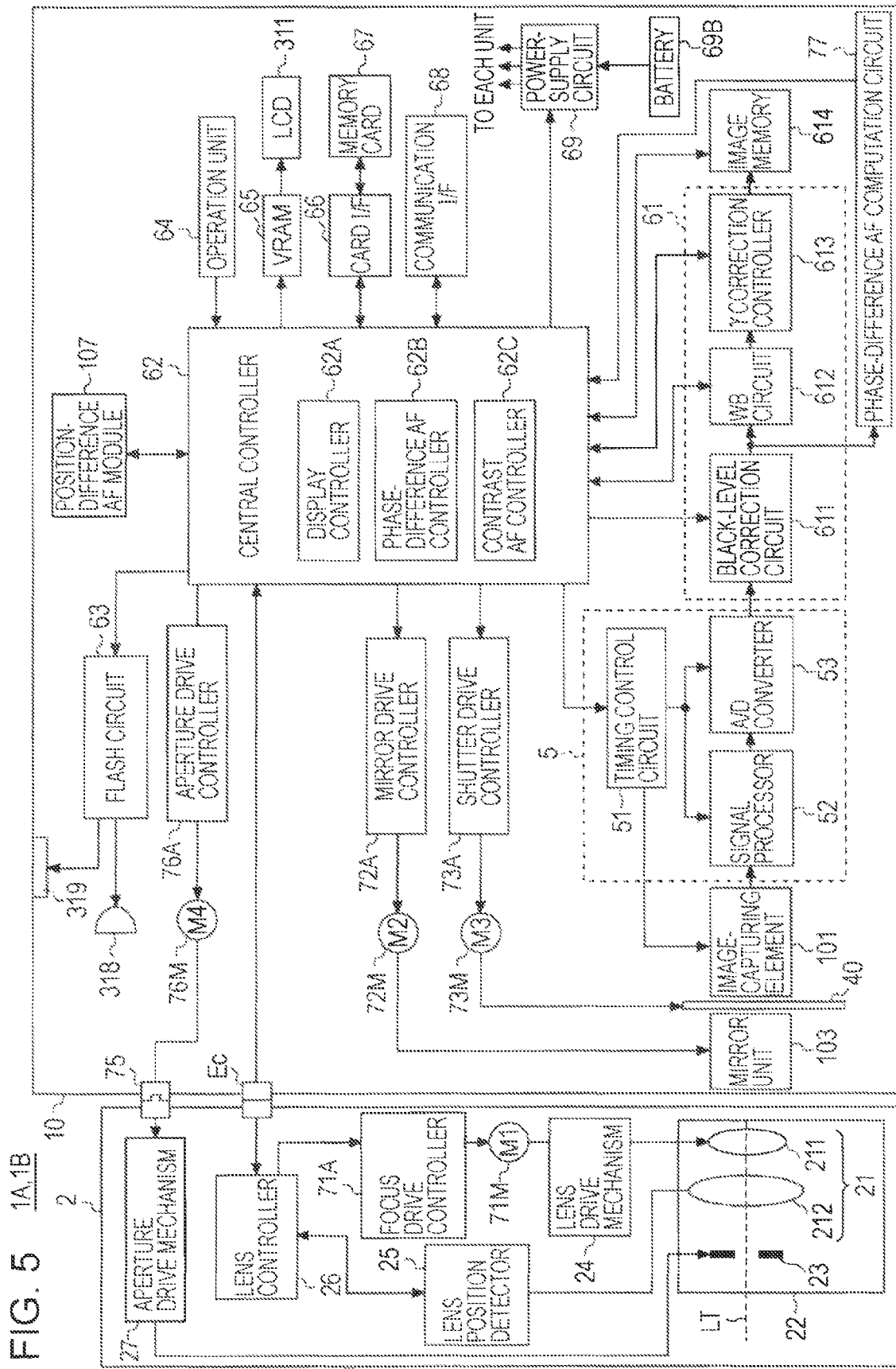
FIG. 5 is a block diagram showing the electrical configuration of the image-capturing apparatus.

In more detail, the interchangeable lens 2 includes a lens group 21 formed of a plurality of lenses arranged in a serial manner along an optical axis LT (see FIG. 5). The lens group 21 includes a focus lens 211 (FIG. 5) for adjusting focus and a zoom lens 212 (FIG. 5) for performing variable power. As a result of the lenses being driven in the direction of the optical axis LT (see FIG. 3), focus adjustment and variable power are performed, respectively. The interchangeable lens 2 is provided with an operation ring that is rotatable along the outer peripheral surface of a lens barrel at an appropriate outer peripheral place. The zoom lens 212 is moved in an optical-axis direction in accordance with the rotational direction and the number of revolutions of the operation ring by manual operation or by automatic operation so that the zoom lens 212 is set at a zoom magnification (image-capturing magnification) corresponding to the position of a movement destination.

The mount unit 301 is provided with a connector Ec (see FIG. 5) for making electrical connection with the mounted interchangeable lens 2 and a coupler 75 (FIG. 5) for making mechanical connection.

The lens exchange button 302 is a button that is pressed when the interchangeable lens 2 mounted in the mount unit 301 is to be demounted.

The grip unit 303 is a part at which the image-capturing apparatus 1A is gripped by an image-capturing person (user) during image capturing. The grip unit 303 is provided with surface grooves that fit the finger shape for added comfort. A battery compartment and a card compartment (not shown) are provided inside the grip unit 303. The battery compartment is housed with a battery 69B (see FIG. 5) as a power supply for the image-capturing apparatus 1A, and the card compartment is housed with a memory card 67 (FIG. 5) for recording image data of captured images in such a manner that the memory card 67 can be attached thereto and detached therefrom. The grip unit 303 may be provided with a grip sensor for detecting whether the user has gripped the grip unit 303.

The mode setting dial 305 and the control value setting dial 306 are made of members that are substantially disc shaped and that are rotatable within the plane approximately parallel to the top surface of the camera body 10. The mode setting dial 305 is used to select various kinds of modes (various kinds of image-capturing modes (a portrait image-capturing mode, a landscape image-capturing mode, a full auto image-capturing mode, etc.) installed in the image-capturing apparatus 1A, a reproduction mode in which a captured image is reproduced, a communication mode in which data communication is performed with external devices, etc.). On the other hand, the control value setting dial 306 is used to set control values for various kinds of functions installed in the image-capturing apparatus 1A.

The shutter button 307 is a press switch capable of detecting a "half-pressed state" in which the shutter button 307 is pushed in halfway and a "fully pressed state" in which the shutter button 307 is pushed in further. When the shutter button 307 is half-pressed (S1) in the image-capturing mode, preparatory operations (preparatory operations, such as setting of an exposure control value and focus detection) for capturing a still image of an object are performed. When the shutter button 307 is fully pressed (S2), image capturing operations (a series of operations for exposing the image-capturing element 101 (see FIG. 3), performing predetermined image processing on an image signal obtained by the exposure, and recording the image signal in a memory card or the like) are performed.

As shown in FIG. 2, provided on the back side of the camera body 10 are an liquid-crystal display (LCD) 311 functioning as a display unit; a finder window 316 disposed above the LCD 311; an eyecup 321 that surrounds the finder window 316; a main switch 317 disposed to the left of the finder window 316; an exposure correction button 323 and an AE lock button 324, which are disposed to the right of the finder window 316; a flash unit 318 disposed above the finder window 316; and a connection terminal unit 319 disposed above the finder window 316. Provided on the back side of the camera body 10 are a setting button group 312 arranged to the left of the LCD 311; a direction selection key 314 arranged to the right of the LCD 311; a push button 315 arranged in the center of the direction selection key 314; and a display selector switch 85 arranged to the lower right of the direction selection key 314.

The LCD 311 includes a color liquid-crystal panel capable of performing image display, so that an image captured using the image-capturing element 101 (see FIG. 3) is displayed or a recorded image is reproduced and displayed and also, a screen for setting functions and modes installed in the image-capturing apparatus 1A is displayed. In place of the LCD 311, an organic EL display device or a plasma display device may be used.

The finder window (eyepiece window) 316 forms an optical finder (OVF), and light (object light), which forms an object image that passes through the interchangeable lens 2, is guided to the finder window 316. By viewing the finder window 316, it is possible for the user to visually recognize an object image captured in practice by the image-capturing element 101.

The main switch 317 is formed of a two-contact slide switch that slides side by side. When the main switch 317 is set to the left, the power supply of the image-capturing apparatus 1A is switched on, and when the main switch 317 is set to the right, the power supply is switched off.

The flash unit 318 is configured as a pop-up built-in flash. On the other hand, in a case where an external flash or the like is to be mounted in the camera body 10, connection is made using the connection terminal unit 319.

The eyecup 321 is a U-shaped light-shielding member, which suppresses intrusion of extraneous light to the finder window 316.

The exposure correction button 323 is a button for manually adjusting exposure values (an aperture value and a shutter speed). The AE lock button 324 is a button for fixing exposure.

The setting button group 312 includes buttons for performing operations for various kinds of functions installed in the image-capturing apparatus 1A. Examples of the setting button group 312 include a menu button for displaying the menu screen on the LCD 311 and a menu switching button for switching between content displayed on the menu screen.

The direction selection key 314 has an annular member including a plurality of press units (triangular marks in the figure) arranged at fixed intervals in the circumferential direction, so that a pressing operation of a press unit is detected using a contact (switch) (not shown) provided in such a manner as to correspond to each press unit. The push button 315 is arranged in the center of the direction selection key 314. The direction selection key 314 and the push button 315 are used to input instructions for changing image-capturing magnification (the movement of the zoom lens 212 (see FIG. 5) in the wide direction or in the tele direction), for advancing the frame of a recording image to be reproduced on the LCD 311 or the like, and for setting image capturing conditions (an aperture value, a shutter speed, presence or absence of flash light emission, and the like).

The display selector switch 85 is formed of a two-point slide switch. When the contact is set at an "optical" position in the upper area, an optical finder mode (also referred to as an "OVF mode") is selected, and an object image is displayed within the field of view of the optical finder. As a result, it is possible for the user to perform a composition determination operation (framing) by visually recognizing an object image displayed within the field of view of the optical finder via the finder window 316.

On the other hand, when the contact of the display selector switch 85 is set at a "monitor" position in the lower area, an electronic finder mode (also referred to as an "EVF mode" or a "live-view mode") is selected, and a live-view image related to the object image is displayed on the LCD 311 in a movie-like mode. As a result, it is possible for the user to perform framing by visually recognizing a live-view image displayed on the LCD 311.

As described above, it is possible for the user to switch the finder mode by operating the display selector switch 85. In the image-capturing apparatus 1A, it is possible to perform the composition determination of an object by using an electronic finder in which a live-view display is performed or an optical finder.

Internal Configuration of Image-Capturing Apparatus 1A

Figure 3:
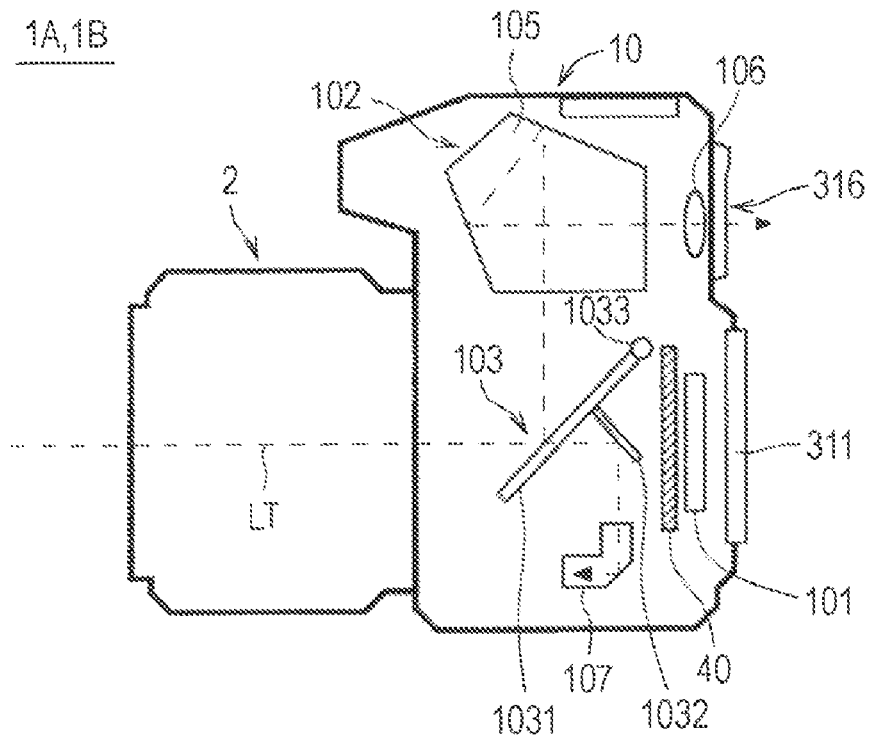
FIG. 3 is a longitudinal sectional view of the image-capturing apparatus.
Figure 4:
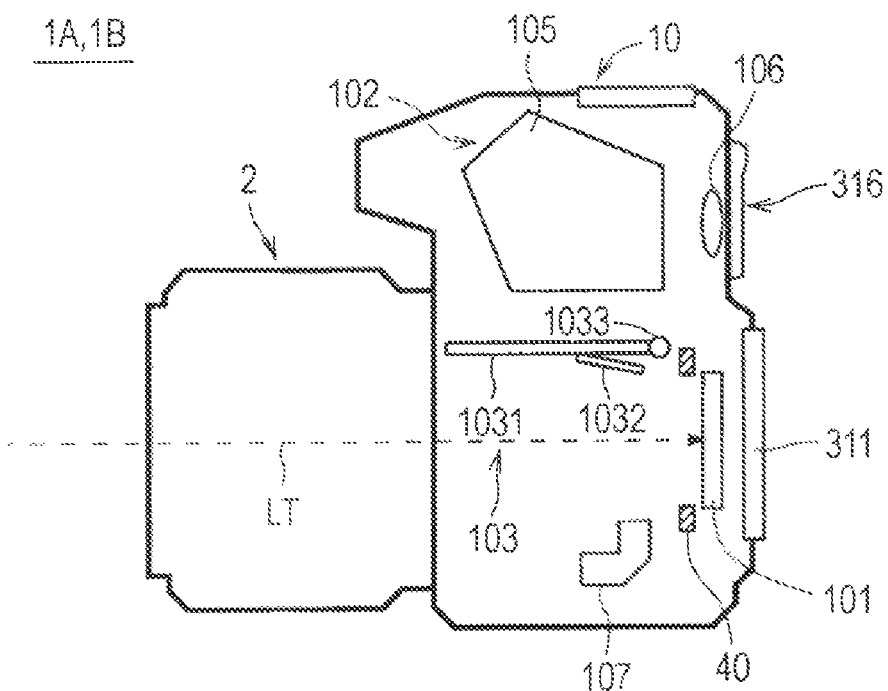
FIG. 4 is a longitudinal sectional view of the image-capturing apparatus.

Next, the internal configuration of the image-capturing apparatus 1A will be described. FIGS. 3 and 4 are longitudinal sectional views of the image-capturing apparatus 1A. As shown in FIG. 3, an image-capturing element 101, a finder unit 102 (finder optical system), a mirror unit 103, a phase-difference AF module (also referred to simply as an "AF module") 107, and the like are provided inside the camera body 10.

The image-capturing element 101 is arranged perpendicularly to the optical axis LT along the optical axis LT of the lens group 21 provided in the interchangeable lens 2 in a case where the interchangeable lens 2 is mounted in the camera body 10. For the image-capturing element 101, for example, a CMOS color-area sensor (CMOS image-capturing element) in which a plurality of pixels each having a photodiode are arranged in matrix in a two dimensional manner is used. The image-capturing element 101 generates an analog electrical signal (image signal) of components of each color of R (red), G (green), and B (blue), which are related to an object image that is formed as an image after passing through the interchangeable lens 2, and outputs an image signal of each color of R, G, and B.

Furthermore, the image-capturing element 101 has pixels for detecting a phase difference on the image-capturing plane, the details of which will be described later.

In the optical axis LT, the mirror unit 103 is arranged at a position at which object light is reflected toward the finder unit 102. The object light passing through the interchangeable lens 2 is reflected upward by the mirror unit 103 (a main mirror 1031 (to be described later)) and also, some of the object light is transmitted through the mirror unit 103.

The finder unit 102 includes a pentaprism 105, an eyepiece lens 106, and a finder window 316. The pentaprism 105 is a prism that has a pentagonal shape in cross section, by which the top and bottom and the left and right of an object image formed by light entering the lower surface of the prism are flipped by the reflection in the inside and formed as an erect image. The eyepiece lens 106 guides the light of the object image formed as an erect image by the pentaprism 105 to the outside of the finder window 316. With such a configuration, the finder unit 102 functions as an optical finder for confirming an object field at image-capturing waiting time before actual image capturing.

The mirror unit 103 includes the main mirror 1031 and a sub-mirror 1032. On the back side of the main mirror 1031, the sub-mirror 1032 is rotatably provided in such a manner as to fall toward the back side of the main mirror 1031. Some of the object light passing through the main mirror 1031 is reflected by the sub-mirror 1032, and the reflected object light enters the AF module 107.

The mirror unit 103 is configured as a so-called quick return mirror. For example, during exposure time (during actual image capturing) (see FIG. 4), the mirror unit 103 jumps upward by using a rotational axis 1033 as a fulcrum and reaches a retracted state (mirror-up state) from the light path of the object light. At this time, when the mirror unit 103 is stopped at a position below the pentaprism 105, the sub-mirror 1032 becomes folded so as to be substantially parallel to the main mirror 1031. As a result, the object light from the interchangeable lens 2 reaches the image-capturing element 101 without being shielded by the mirror unit 103, and the image-capturing element 101 is exposed. When the image-capturing operation in the image-capturing element 101 is completed, the mirror unit 103 returns to the original position (the position shown in FIG. 3) and reaches a mirror-down state.

Furthermore, by causing the mirror unit 103 to reach a mirror-up state before actual image capturing (image capturing for image recording purpose), it becomes possible for the image-capturing apparatus 1A to perform a live-view (preview) display in which an object is displayed on the LCD 311 in a movie-like mode on the basis of image signals generated in sequence by the image-capturing element 101.

The AF module 107 is configured as a so-called AF sensor formed of a range-finding element (also referred to as a "range-finding sensor") for detecting focusing information of an object. The AF module 107 is disposed in the bottom part of the mirror unit 103 and has a phase-difference detection function of generating a phase-difference detection signal corresponding to the degree of focusing of an object image. That is, in a case where the object is to be confirmed by the user by using the finder window 316 during image-capturing waiting time, as shown in FIG. 3, the object light is guided to the AF module 107 in a state in which the main mirror 1031 and the sub-mirror 1032 are made down and also, a phase-difference detection signal is output from the AF module 107.

On the front side in the optical-axis direction of the image-capturing element 101, a shutter unit 40 is arranged. The shutter unit 40 includes a curtain that moves in the up-and-down direction, and is configured as a mechanical focal plane shutter for performing a light-path opening operation and a light-path shielding operation for object light that is guided to the image-capturing element 101 along the optical axis LT. The shutter unit 40 can be omitted in a case where the image-capturing element 101 is a completely electronic shutter capable image-capturing element.

Electrical Configuration of Image-Capturing Apparatus 1A

FIG. 5 is a block diagram showing the electrical configuration of the image-capturing apparatus 1A. Here, members identical to those in FIGS. 1 to 4 are designated with the same reference numerals. For the sake of description, the electrical configuration of the interchangeable lens 2 will be described.

The interchangeable lens 2 includes, in addition to the lens group 21 constituting the above-described image-capturing optical system, a lens drive mechanism 24, a lens position detector 25, a lens controller 26, and an aperture drive mechanism 27.

In the lens group 21, the focus lens 211, the zoom lens 212, and the aperture 23 for adjusting the amount of light that enters the image-capturing element 101 are held in the direction of the optical axis LT (FIG. 3) within the lens barrel. Object light received by the lens group 21 is formed as an image in the image-capturing element 101. In automatic focusing (AF) control, focus adjustment is performed by the focus lens 211 being driven in the direction of the optical axis LT by an AF actuator 71M inside the interchangeable lens 2.

On the basis of the AF control signal supplied from the central controller 62 via the lens controller 26, the focus drive controller 71A generates a driving control signal necessary to move the focus lens 211 to the focus position, and controls the AF actuator 71M by using the driving control signal. The AF actuator 71M is formed of a stepping motor and the like, and supplies a lens driving force to the lens drive mechanism 24.

The lens drive mechanism 24 is formed of, for example, a helicoid and gears (not shown) with which the helicoid is rotated. By receiving a driving force from the AF actuator 71M, the lens drive mechanism 24 causes the focus lens 211 and the like to be driven in a direction parallel to the optical axis LT. The movement direction and the amount of movement of the focus lens 211 accord with the rotational direction and the number of revolutions of the AF actuator 71M, respectively.

The lens position detector 25 includes an encoding plate on which a plurality of code patterns are formed at predetermined pitches in the direction of the optical axis LT within the range of the movement of the lens group 21, and an encoder brush that moves integrally with a lens while slidably contacting the encoding plate, and detects the amount of movement when the focus of the lens group 21 is to be adjusted. The lens position detected by the lens position detector 24 is output as, for example, the number of pulses.

The lens controller 26 is constituted by a microcomputer in which, for example, a ROM storing control programs or a memory such as a flash memory storing data on status information is incorporated.

The lens controller 26 has a communication function of performing communication with the central controller 62 of the camera body 10 via the connector Ec. As a result, for example, status information data, such as the focus distance, the in-focus distance, or the peripheral light amount status of the lens group 21, and the position information on the focus lens 211, which is detected by the lens position detector 25, can be transmitted to the central controller 62. Also, for example, data on the amount of driving of the focus lens 211 can be received from the central controller 62.

Upon receiving the driving force from the aperture driving actuator 76M via the coupler 75, the aperture drive mechanism 27 changes the aperture diameter of the aperture 23.

Next, the electrical configuration of the camera body 10 will be described. The camera body 10 includes, in addition to the above-described image-capturing element 101, the shutter unit 40 and the like, an analog front end (AFE) 5, an image processor 61, an image memory 614, a central controller 62, a flash circuit 63, an operation unit 64, a VRAM 65, a card I/F 66, a memory card 67, a communication I/F 68, a power-supply circuit 69, a battery 69B, a mirror driving controller 72A, a shutter driving controller 73A, and an aperture driving controller 76A.

The image-capturing element 101 is formed of a CMOS color-area sensor, as described earlier. A timing control circuit 51 (to be described later) controls image-capturing operations, such as the start (and the completion) of the exposure operation of the image-capturing element 101, selection of the output of each pixel provided in the image-capturing element 101, and the reading of a pixel signal.

The AFE 5 has functions of supplying, to the image-capturing element 101, a timing pulse at which a predetermined operation is performed, performing predetermined signal processing on an image signal output from the image-capturing element 101 so that the image signal is converted into a digital signal, and outputting the digital signal to the image processor 61. The AFE 5 is configured to have a timing control circuit 51, a signal processor 52, an A/D converter 53, and the like.

The timing control circuit 51 generates predetermined timing pulses (pulses for generating a vertical scanning pulse φVn, a horizontal scanning pulse φVm, a reset signal φVr, and the like) on the basis of a reference clock output from the central controller 62, and outputs the timing signal to the image-capturing element 101, thereby controlling the image-capturing operation of the image-capturing element 101. By outputting predetermined timing pulses to the signal processor 52 and the A/D converter 53, respectively, the operations of the signal processor 52 and the A/D converter 53 are controlled.

The signal processor 52 performs predetermined analog signal processing on an analog image signal output from the image-capturing element 101. The signal processor 52 includes a correlated double sampling (CDS) circuit, an automatic gain control (AGC) circuit, a clamp circuit, and the like. On the basis of a timing pulse output from the timing control circuit 51, the A/D converter 53 converts analog image signals of R, G, and B, which are output from the signal processor 52, into digital image signals made up of a plurality of bits (for example, 12 bits).

The image processor 61 creates an image file by performing predetermined signal processing on image data output from the AFE 5. The image processor 61 is configured to have a black-level correction circuit 611, a white-balance control circuit 612, a gamma correction circuit 613, and the like. The image data received by the image processor 61 is once written in an image memory 614 in synchronization with the reading of the image-capturing element 101. Hereinafter, access is made to the image data written in the image memory 614, and processing is performed in each block of the image processor 61.

The black-level correction circuit 611 corrects the black level of each digital image signal of R, G, and B, which is A/D-converted by the A/D converter 53, into a reference black level.

On the basis of the reference for white in accordance with the light source, the white-balance control circuit 612 performs level conversion (white-balance (WB) adjustment) of a digital signal of components of each color of R (red), G (green), and B (blue). More specifically, on the basis of the WB adjustment data supplied from the central controller 62, the white-balance control circuit 612 specifies, from luminance data, color saturation data, and the like, a portion that is estimated to be originally white color in an image-capturing object, determines the average of the components of each of R, G, and B of that portion, a G/R ratio, and a G/B ratio, and performs level correction by using these ratios as correction gains of R and B.

The gamma correction circuit 613 corrects gradation characteristics of WB-adjusted image data. More specifically, by using a preset gamma correction table, the gamma correction circuit 613 performs, for each color component, non-linear conversion of the level of the image data, and offset adjustment.

The image memory 614 is a memory used as a work area in which, during the image-capturing mode, image data output from the image processor 61 is temporarily stored and also, a predetermined process is performed on the image data by the central controller 62. Furthermore, during the reproduction mode, image data read from the memory card 67 is temporarily stored.

The central controller 62 is configured as a microcomputer, which mainly includes a CPU, a memory, a ROM, and the like. The central controller 62 reads programs stored in the ROM and causes the CPU to execute the programs, thereby implementing various kinds of functions of the image-capturing apparatus 1A.

As a result of the execution of the programs, the central controller 62 realizes a display controller 62A, a phase-difference AF controller 62B, and a contrast AF controller 62C in a functional manner.

The display controller 62A controls display content on the LCD 311. For example, the display controller 62A causes each of a plurality of images that are continuously obtained by the image-capturing element 101 to be sequentially displayed as a live-view image on the LCD 311.

Furthermore, the display controller 62A combines, with a live-view image, an area (also referred to as an "AF area", a "range-finding area", or a "focus area") Ef (see FIG. 6) for obtaining focus information used for an AF operation so that they are displayed in a superposed manner, the details of which will be described later.

The phase-difference AF controller 62B performs focus position detection by using a phase-difference detection method and performs an automatic focusing operation. More specifically, on the basis of a phase-difference detection signal obtained by the AF module 107 or an output signal from a phase-difference AF computation circuit 77 (to be described later), the phase-difference AF controller 62B performs a focus lens position specifying operation that specifies the position (focus lens position) of an image-capturing lens (in more detail, a focus lens) during in-focus.

The contrast AF controller 62C performs an automatic focusing operation (also referred to as a "contrast AF operation") by performing focus position detection by using a contrast detection method. More specifically, the contrast AF controller 62C performs an evaluation value computation operation for determining an evaluation value in accordance with the contrast of the object images with regard to a plurality of captured images obtained at different lens positions, respectively, and a focus lens position specifying operation for specifying a lens position at which the evaluation value is optimized (e.g., minimized) as a focus lens position.

The flash circuit 63 controls the amount of light emission of the flash unit 318 or an external flash connected to the connection terminal unit 319 so as to be set to the amount of light emission set by the central controller 62.

The operation unit 64 includes the mode setting dial 305, the control value setting dial 306, the shutter button 307, the setting button group 312, the direction selection key 314, the push button 315, the main switch 317, etc., and is used to input operation information to the central controller 62.

The VRAM 65 is a buffer memory between the central controller 62 and the LCD 311, which has a storage capacity of image signals corresponding to the number of pixels of the LCD 311. The card I/F 66 is an interface for enabling transmission and reception of signals between the memory card 67 and the central controller 62. The memory card 67 is a recording medium for storing image data generated by the central controller 62. The communication I/F 68 is an interface for enabling transmission of image data and the like to a personal computer or another external device.

The power-supply circuit 69 is formed of, for example, a constant voltage circuit and the like, and generates a voltage for driving the entire image-capturing apparatus 1A, such as the controller (such as the central controller 62), the image-capturing element 101, and other various kinds of driving units. Control of electricity supply to the image-capturing element 101 is performed in accordance with a control signal supplied from the central controller 62 to the power-supply circuit 69. The battery 69B is a power supply that is formed of a primary battery such as an alkali dry battery or a secondary battery such as a nickel-metal-hydride rechargeable battery, and that supplies electric power to the entire image-capturing apparatus 1A.

The mirror driving controller 72A generates a driving signal for driving the mirror driving actuator 72M in accordance with the switching of the finder mode or the timing of the image capturing operation. The mirror driving actuator 72M is an actuator that causes the mirror unit 103 (quick return mirror) to be rotated in a horizontal posture or in an inclined posture.

The shutter driving controller 73A generates a driving control signal for the shutter driving actuator 73M on the basis of the control signal supplied from the central controller 62. The shutter driving actuator 73M is an actuator for driving the opening/closing of the shutter unit 40.

The aperture driving controller 76A generates a driving control signal for the aperture driving actuator 76M on the basis of the control signal supplied from the central controller 62. The aperture driving actuator 76M supplies a driving force to the aperture drive mechanism 27 via the coupler 75.

The camera body 10 includes a phase-difference AF computation circuit 77 for performing computations necessary at auto-focus (AF) control time on the basis of image data whose black level has been corrected, which is output from the black-level correction circuit 611.

In the following, a phase-difference AF operation using an output signal from the phase-difference AF computation circuit 77 will be described in detail and also, an AF operation that can be performed by the image-capturing apparatus 1A will be described.

Image-Capturing Element 101

Figure 6:
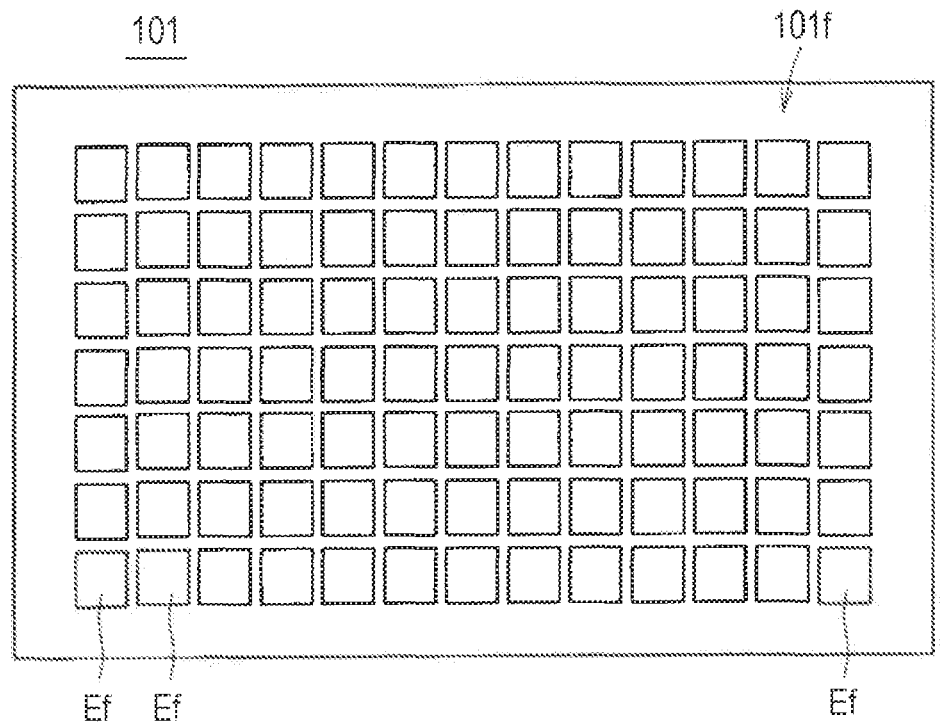
FIG. 6 illustrates the configuration of an image-capturing element.
Figure 7:
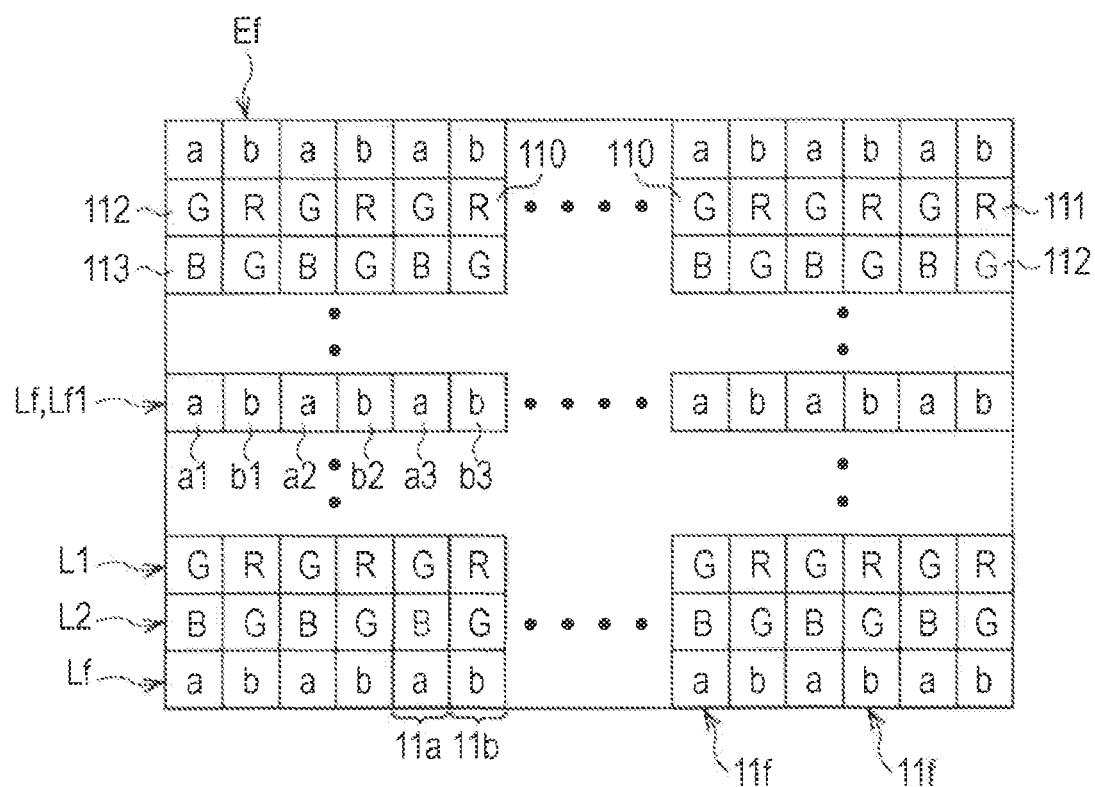
FIG. 7 illustrates the configuration of the image-capturing element.

The image-capturing apparatus 1A is configured in such a manner that phase-difference AF is possible by receiving light that is passed through (transmitted through) different portions within the exit pupil of the image-capturing lens by the image-capturing element 101. In the following, first, the configuration of the image-capturing element 101 and the principles of phase-difference AF using the image-capturing element 101 will be described. FIGS. 6 and 7 illustrate the configuration of the image-capturing element 101.

As shown in FIG. 6, the image-capturing element 101 is configured in such a manner as to have an AF area Ef defined in matrix in an image-capturing plane 101f thereof, so that focus detection of a phase-difference detection method is possible for each AF area Ef.

In each AF area Ef, ordinary pixels 110 formed of an R pixel 111, a G pixel 112, and a B pixel 113 in which color filters of each of R (red), G (green), and B (blue) are disposed in a photodiode are provided and also, a pixel (hereinafter also referred to as an "AF pixel" or a "photoelectric conversion cell") 11f for performing phase-difference AF are provided (FIG. 7).

Then, in the AF area Ef, a Gr line L1 in which a G pixel 112 and an R pixel 111 are alternately arranged in the horizontal direction as a horizontal line of ordinary pixels, and a Gb line L2 in which a B pixel 113 and a G pixel 112 are alternately arranged in the horizontal direction, are formed. As a result of the Gr line L1 and the Gb line L2 being alternately arranged in the vertical direction, Bayer arrangement is formed.

Furthermore, in the AF area Ef, for example, an AF line Lf in which AF pixels 11f are arranged in the horizontal direction every six horizontal lines of the ordinary pixels is formed. In the AF area Ef, for example, approximately 20 AF lines Lf are provided.

Next, the principles of phase-difference AF using an AF line Lf will be described in detail.

Figure 8:
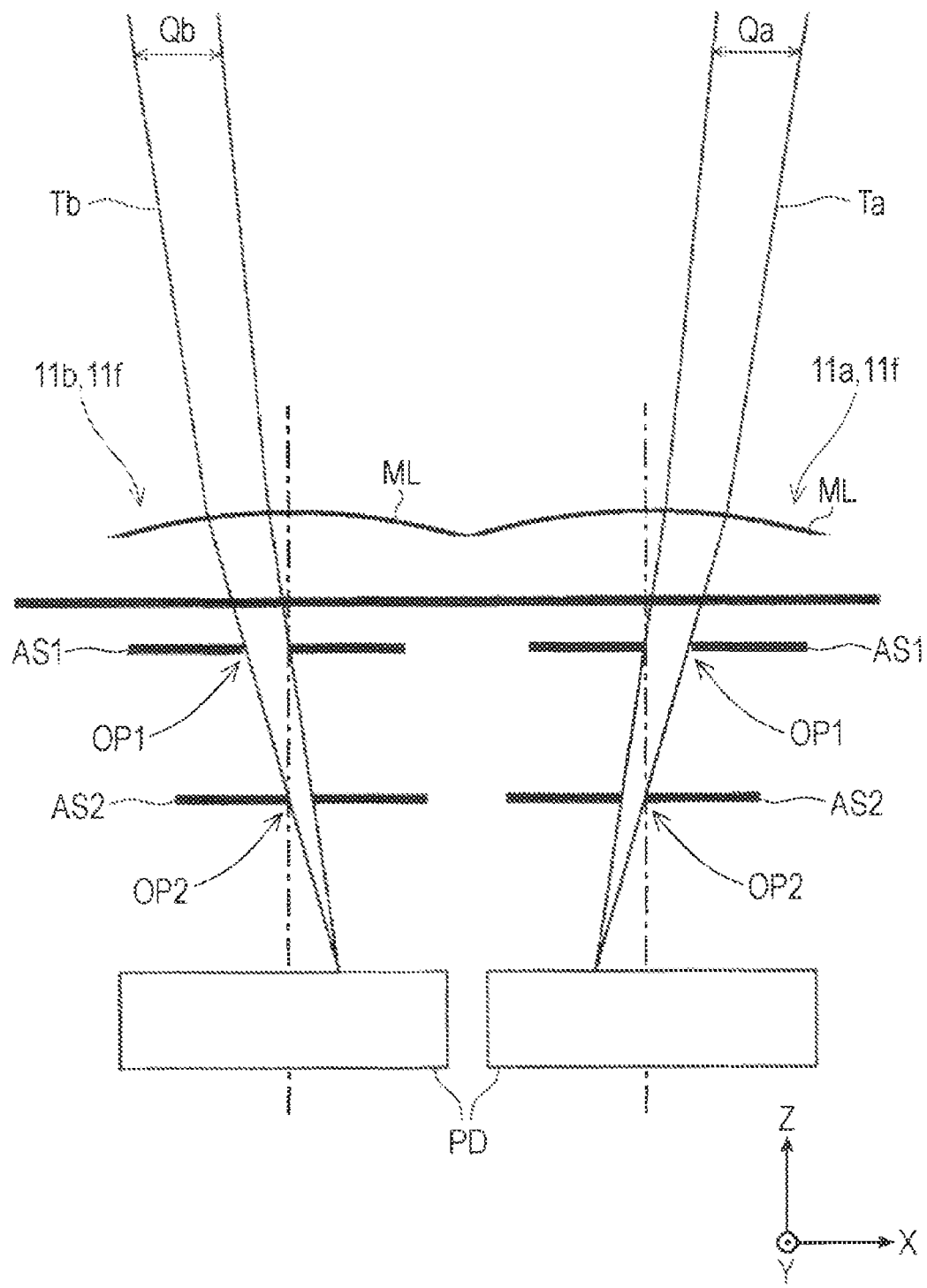
FIG. 8 is a longitudinal sectional view of an AF pixel 11f.
Figure 9:
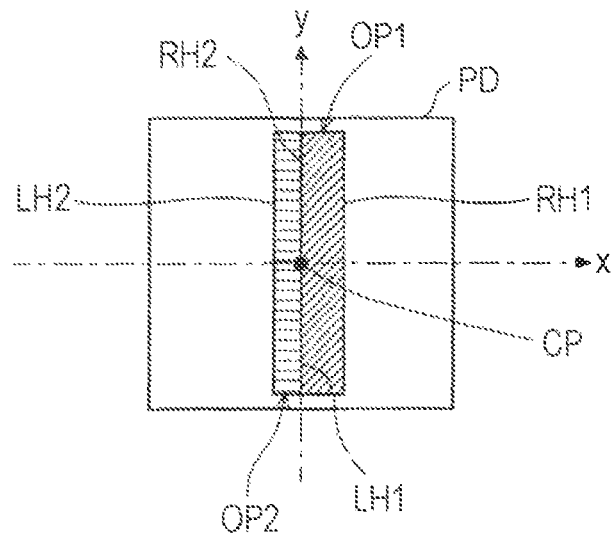
FIG. 9 is a top view of an AF pixel.

FIG. 8 is a longitudinal sectional view of an AF pixel 11f. FIG. 9 is a top view of an AF pixel 11f (here, a first AF pixel 11a (to be described later)). In FIG. 9, a microlens ML for collecting object light in the photoreceiving element PD, and the light-shielding area of the light-shielding plates AS1 and AS2 are omitted, and a photoreceiving element PD, and the openings (also referred to as "light-transmitting areas") OP1 and OP2 of the light-shielding plates AS1 and AS2 are shown.

Figure 10:
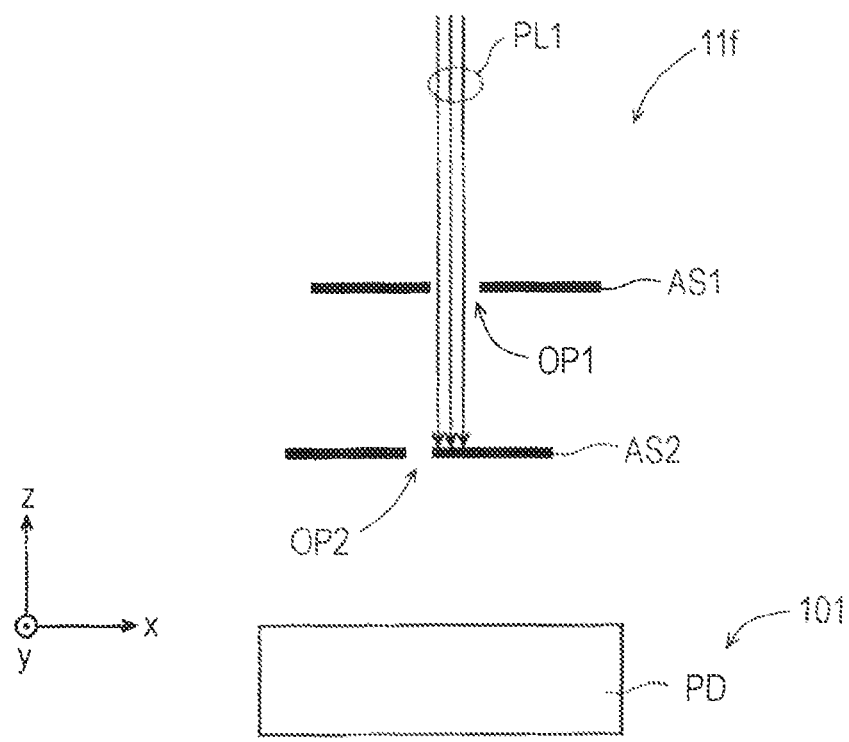
FIG. 10 shows the role of a second light-shielding plate.

FIG. 10 shows the role of the second light-shielding plate AS2. In FIG. 10, for simplification of the drawing, an AF pixel 11*f* in which a microlens ML is omitted is shown.

In the AF line Lf, a pair of pixels 11*a* and 11*b* (see FIG. 8) that receive a light flux Ta from the right-side portion Qa of the exit pupil and a light flux Tb from the left-side portion Qb thereof with regard to the interchangeable lens 2 are arranged in the horizontal direction. In more detail, an AF pixel (also referred to as a "first AF pixel") 11*a* includes a first light-shielding plate (also referred to as a "first light-shielding film") AS1 having a first opening OP1 in a slit (rectangular) shape used to separate a light flux from the exit pupil, and a second light-shielding plate (also referred to as a "second light-shielding film") AS2, which is arranged below the first light-shielding plate AS1 and has a second opening OP2 in a slit (rectangular) shape. As shown in FIG. 9, the first opening OP1 (an oblique-line hatched area in FIG. 9) is provided at a position offset in a specific direction (here, in the right direction (+X direction)) by using the center CP of the photoelectric converter (also referred to as a "photoreceiving element" or a "photodiode") PD as a reference (origin). The second opening OP2 (a horizontal-line hatched area in FIG. 9) is provided at a position offset in a direction (here, in the left direction (−X direction)) opposite to the specific direction by using the center of the photoreceiving element PD as a reference. In more detail, in the first AF pixel 11*a*, in a case where the first opening OP1 and the second opening OP2 are projected in the Z-axis direction on the top surface of the photoreceiving element PD, the first opening OP1 is provided in a specific direction by using the center CP of the photoreceiving element PD as a reference, and the second opening OP2 is provided in a direction opposite to the specific direction.

On the other hand, the AF pixel (hereinafter also referred to as a "second AF pixel") 11*b* includes a first light-shielding plate AS1 in which a first opening OP1 is provided at a position offset in a direction opposite to the specific direction by using the center of the photoreceiving element PD as a reference, and a second light-shielding plate AS2 in which a second opening OP2 is provided at a position offset in a specific direction by using the center of the photoreceiving element PD as a reference. In more detail, in the second AF pixel 11*b*, in a case where the first opening OP1 and the second opening OP2 are projected in the Z-axis direction on the top surface of the photoreceiving element PD, the first opening OP1 is provided in a direction opposite to the specific direction by using the center CP of the photoreceiving element PD as a reference, and the second opening OP2 is provided in the specific direction.

That is, in the pair of AF pixels 11*a* and 11*b*, the first opening OP1 and the second opening OP2 are arranged in such a manner as to be offset in mutually different directions.

In a case where a light beam perpendicular to the photoreceiving surface of the image-capturing element 101 is emitted from the photoreceiving surface of the image-capturing element 101 to the first light-shielding plate AS1, the second light-shielding plate AS2 in the AF pixel 11*f* can also be represented as being arranged at a position that shields all the light PL1 that has been transmitted through the first opening OP1 (see FIG. 10).

In the pair of AF pixels 11*a* and 11*b*, the light flux Ta from the right-side portion Qa of the exit pupil passes through the microlens ML and the first opening OP1 of the first light-shielding plate AS1. Furthermore, after the light flux Ta is limited by the second light-shielding plate AS2, it is received by the photoreceiving element PD of the first AF pixel 11*a*. The light flux Tb from the left-side portion Qb of the exit pupil passes through the microlens ML and the first opening OP1 of the second light-shielding plate AS2. Furthermore, after the light flux Tb is limited by the second light-shielding plate AS2, it is received by the photoreceiving element PD of the second AF pixel 11*b*.

As described above, in each photoreceiving element PD in the pair of AF pixels 11*a* and 11*b*, the light fluxes Ta and Tb of the object light that has been transmitted the right-side portion and the left-side portion (pair of portion areas) Qa and Qb in the exit pupil of the interchangeable lens 2 are received, respectively, and ranging signals corresponding to the received light fluxes Ta and Tb are generated.

Furthermore, in the pair of AF pixels 11*a* and 11*b*, since a light flux from the exit pupil can be appropriately separated (pupil-divided) and received, focus detection accuracy is improved, the details of which will be described later.

Figure 11:
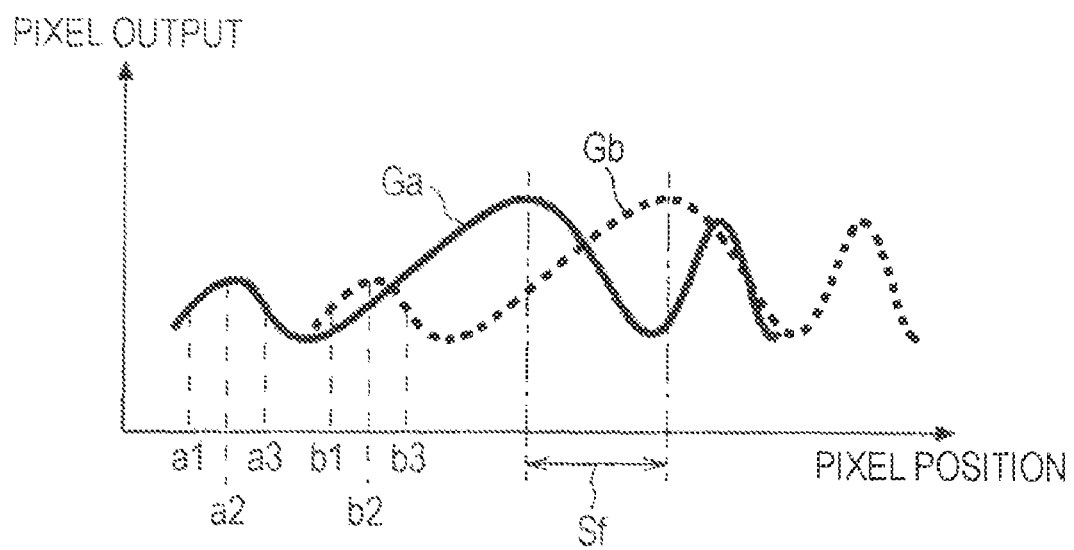
FIG. 11 shows pixel output of an AF line.
Figure 12:
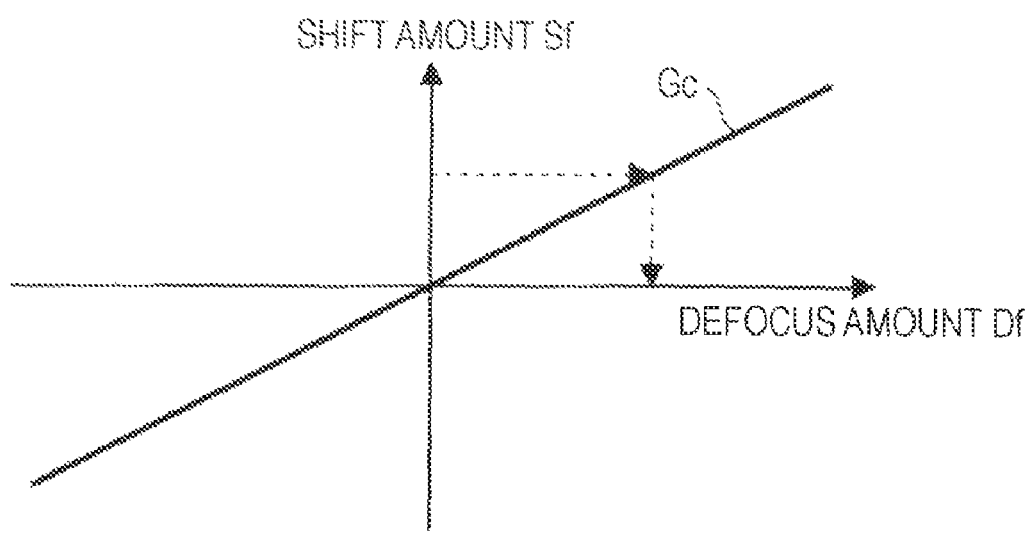
FIG. 12 shows the shift amount and the defocus amount of pixel output.

In the following, the pixel output of the first AF pixel 11*a* will be referred to as "pixel output of sequence a", and the pixel output of the second AF pixel 11*b* will be referred to as "pixel output of sequence b". For example, the relationship between the pixel output of sequence a and the pixel output of sequence b, which are obtained from the pixel arrangement of the AF pixels 11*f* arranged in one AF line Lf1 in FIG. 7, will be described. FIG. 11 shows the pixel output of the AF line Lf1. FIG. 12 shows the shift amount Sf and the defocus amount Df of pixel output.

In the AF line Lf1, the light fluxes Ta and Tb from both sides of the exit pupil are received by the first AF pixel 11*a* and the second AF pixel 11*b*, respectively. Then, the pixel output of sequence a in the AF line Lf1 including pixels a1 to a3 of sequence a is expressed as a graph Ga (shown using the solid line) in FIG. 11. On the other hand, the pixel output of sequence b in the AF line Lf1 including pixels b1 to b3 of sequence b is expressed as a graph Gb (shown using the dashed line).

When the graph Ga and the graph Gb shown in FIG. 11 are compared with each other, it can be seen that, for the pixel output of sequence a and the pixel output of sequence b, a phase difference has occurred in an offset amount (shift amount) Sf in the line direction (in other words, the alternate arrangement direction of the AF pixels 11*f*) of the AF line Lf1.

On the other hand, the relationship between the above-described shift amount Sf and the amount (the defocus amount) Df that the focal plane is defocused to the image-capturing plane of the image-capturing element 101 is represented by a graph Gc of a primary function shown in FIG. 12. The inclination of the graph Gc can be obtained in advance by a factory test and the like.

Therefore, after the shift amount Sf is determined by the phase-difference AF computation circuit 77 on the basis of the output from the AF line Lf of the image-capturing element 101, the phase-difference AF controller 62B computes the defocus amount Df on the basis of the graph Gc of FIG. 12 and supplies the driving amount corresponding to the computed defocus amount Df to the focus lens 211, making possible phase-difference AF that causes the focus lens 211 to be moved to the focus position.

As described above, it is possible for the image-capturing apparatus 1A to perform an automatic focusing operation (also referred to as a "phase-difference AF operation" by the image-capturing element 101) of a phase-difference detection method using an output signal from the AF pixel 11*f* incorporated on the photoreceiving surface of the image-capturing element 101.

Regarding AF Pixel 11*f*

Figure 13:
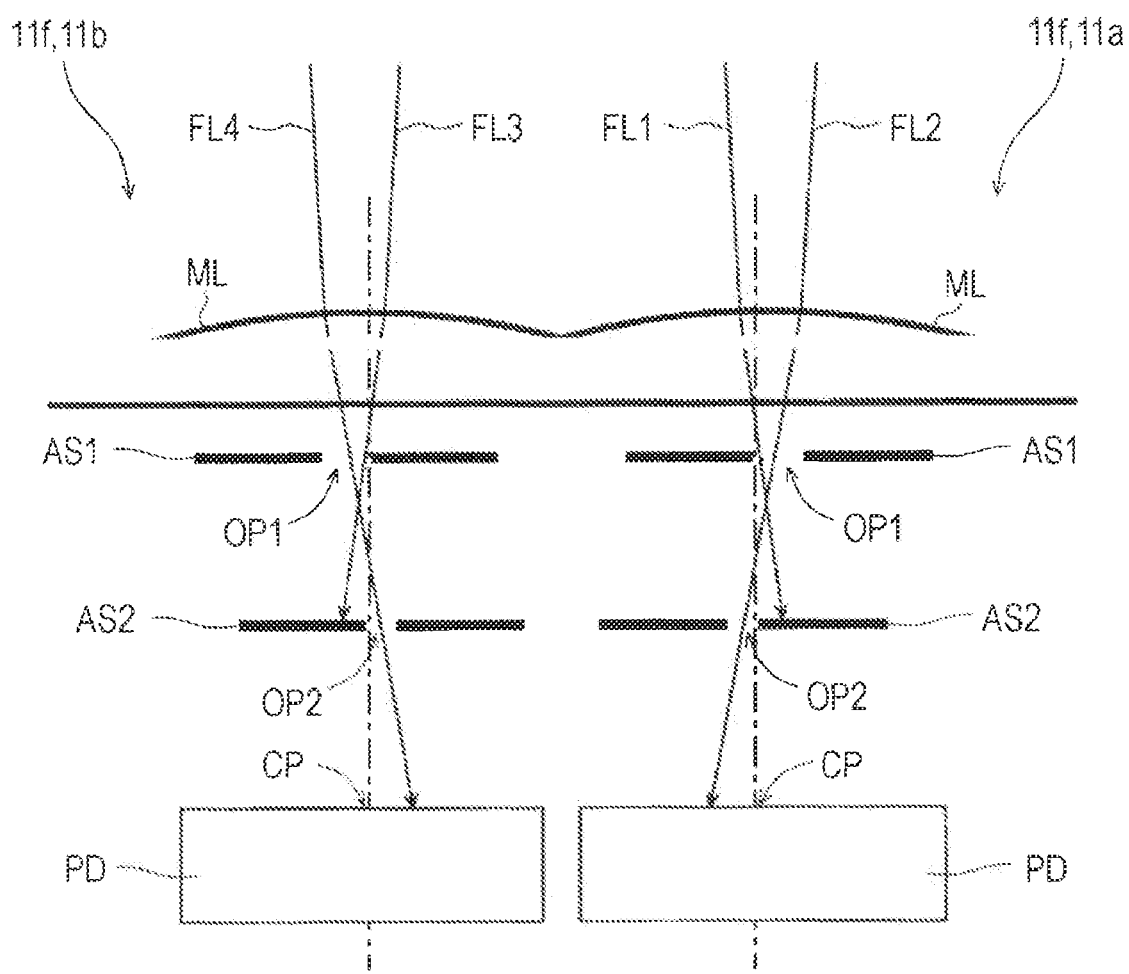
FIG. 13 shows an AF pixel having a first light-shielding plate and a second light-shielding plate.

Next, the AF pixel 11*f* will be described in detail. FIG. 13 shows AF pixels 11*f* (a first AF pixel 11*a* and a second AF pixel 11b) having a first light-shielding plate AS1 and a second light-shielding plate AS2, respectively.

As described above, the AF pixel 11f included in the image-capturing element 101 has the first light-shielding plate AS1 and the second light-shielding plate AS2 (see FIG. 13).

Object light from the image-capturing optical system enters the microlens ML of the first AF pixel 11a, and the object light is limited by the first light-shielding plate AS1. More specifically, the first light-shielding plate AS1 shields object light that has entered the light-shielding area of the first light-shielding plate AS1 and also allows the object light that has entered the first opening OP1 to be passed through. The first opening OP1 is provided in such a manner as to be offset in a specific direction (in one of the alternate arrangement directions of the AF pixels 11f) in the first light-shielding plate AS1. As a consequence, much of the object light that has been transmitted the first opening OP1 will pass through an area in the specific direction in the exit pupil.

Then, the object light that has passed through the first opening OP1 is further limited by the second light-shielding plate AS2, and the object light that has passed through the second opening OP2 of the second light-shielding plate AS2 is received by the photoreceiving element PD. More specifically, since the second opening OP2 is provided in such a manner as to be offset in a direction opposite to the specific direction in the second light-shielding plate AS2, object light FL1 that has passed through an area in a direction opposite to the specific direction in the exit pupil within the object light that has passed through the first opening OP1 is shielded by the light-shielding area of the second light-shielding plate AS2 (FIG. 13). In comparison, object light FL2 that has passed through an area in the specific direction of the exit pupil will pass through the second opening OP2.

In the second AF pixel 11b, since the first opening OP1 and the second opening OP2 are each provided in such a manner as to be offset in a direction opposite to the first AF pixel 11a, object light FL3 that has passed through an area in the specific direction in the exit pupil within the object light that has passed through the first opening OP1 will be shielded by the light-shielding area of the second light-shielding plate AS2. Then, object light FL4 that has passed through an area in a direction opposite to the specific direction in the exit pupil within the object light that has passed through the first opening OP1 passes through the second opening OP2 and is received by the photoreceiving element PD.

As described above, the first light-shielding plate AS1 and the second light-shielding plate AS2 are arranged in the light path of the object light that has been transmitted through the microlens ML, and the second opening OP2 that is offset in a direction opposite to the offset direction of the first opening OP1 in the first light-shielding plate AS1 is provided in the second light-shielding plate AS2. According to the above, since the object light FL1 and object light FL3 that have passed through an area in a direction opposite to a desired direction (also referred to as a "light-receiving target direction") in which light is received in the exit pupil can be shielded, it is possible to appropriately separate a light flux from the exit pupil. That is, in each photoreceiving element PD of the AF pixels 11a and 11b which form a pair, it is possible to receive object light that has passed through a different portion within the exit pupil of the image-capturing lens.

Figure 14:
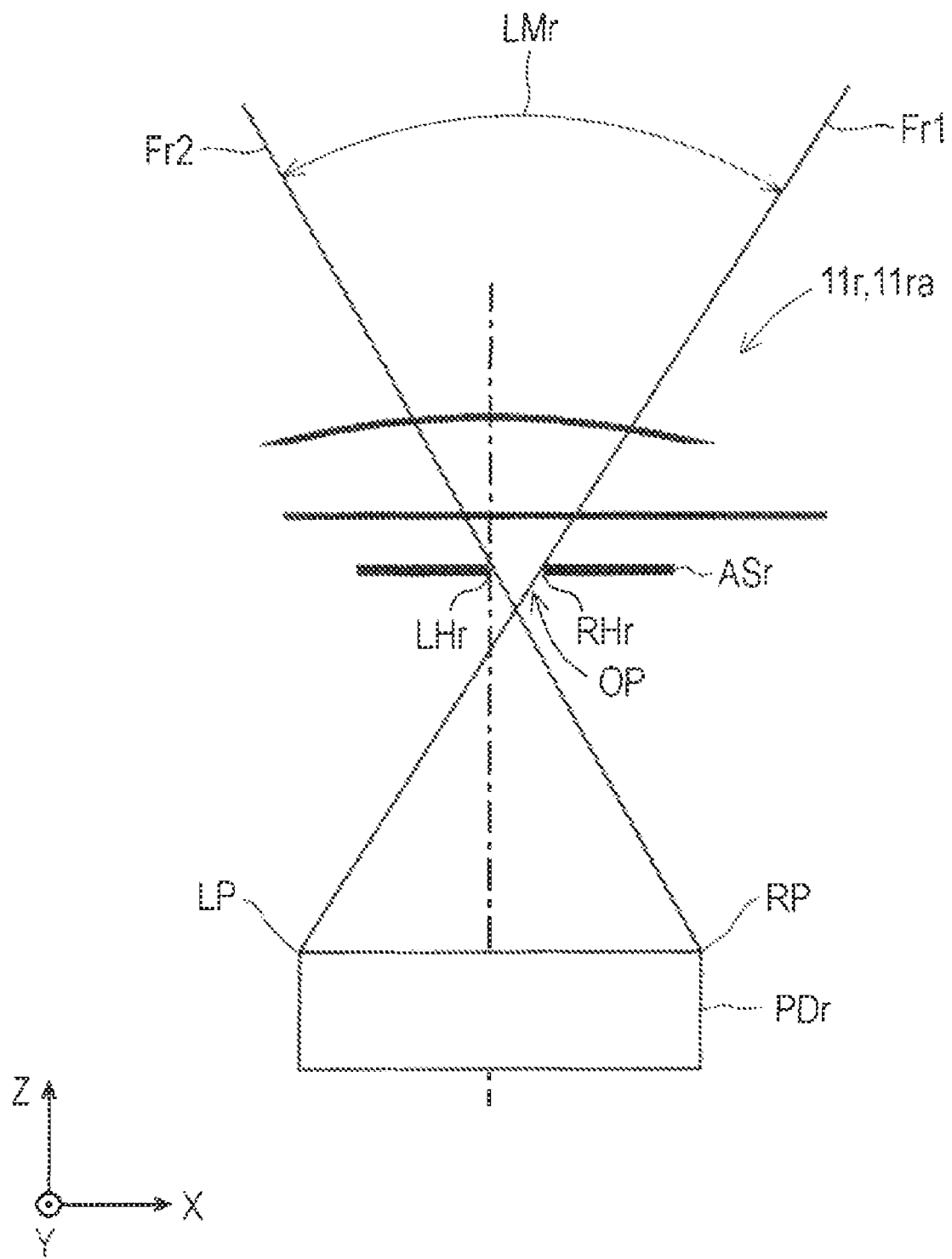
FIG. 14 shows a range in which a photoreceiving element of an AF pixel in a comparative example can receive object light.
Figure 15:
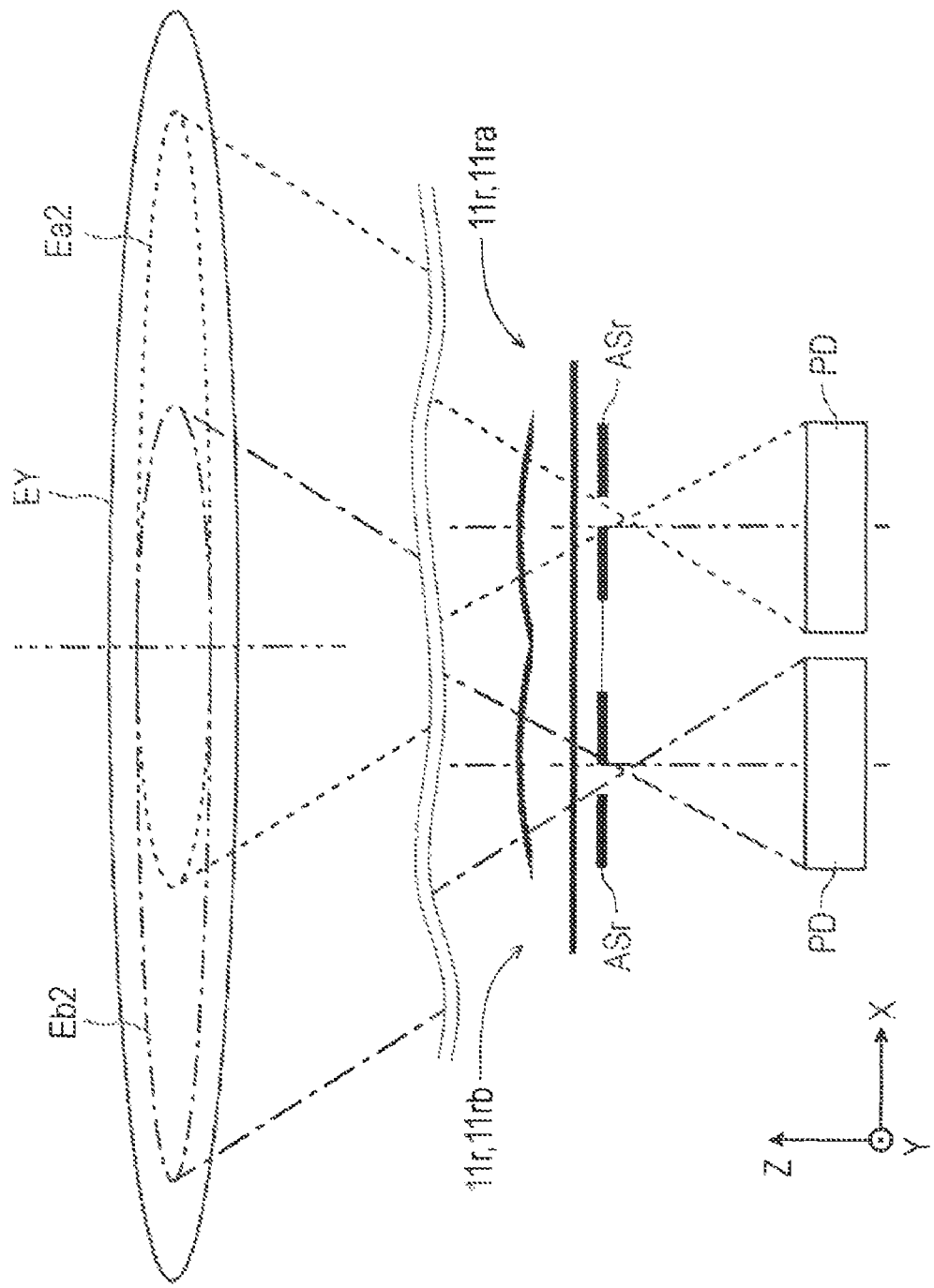
FIG. 15 shows the relationship between the photo-receiving range of each photoreceiving element in a pair of AF pixels in the comparative example and an area corresponding to the photo-receiving range in an exit pupil.
Figure 16:
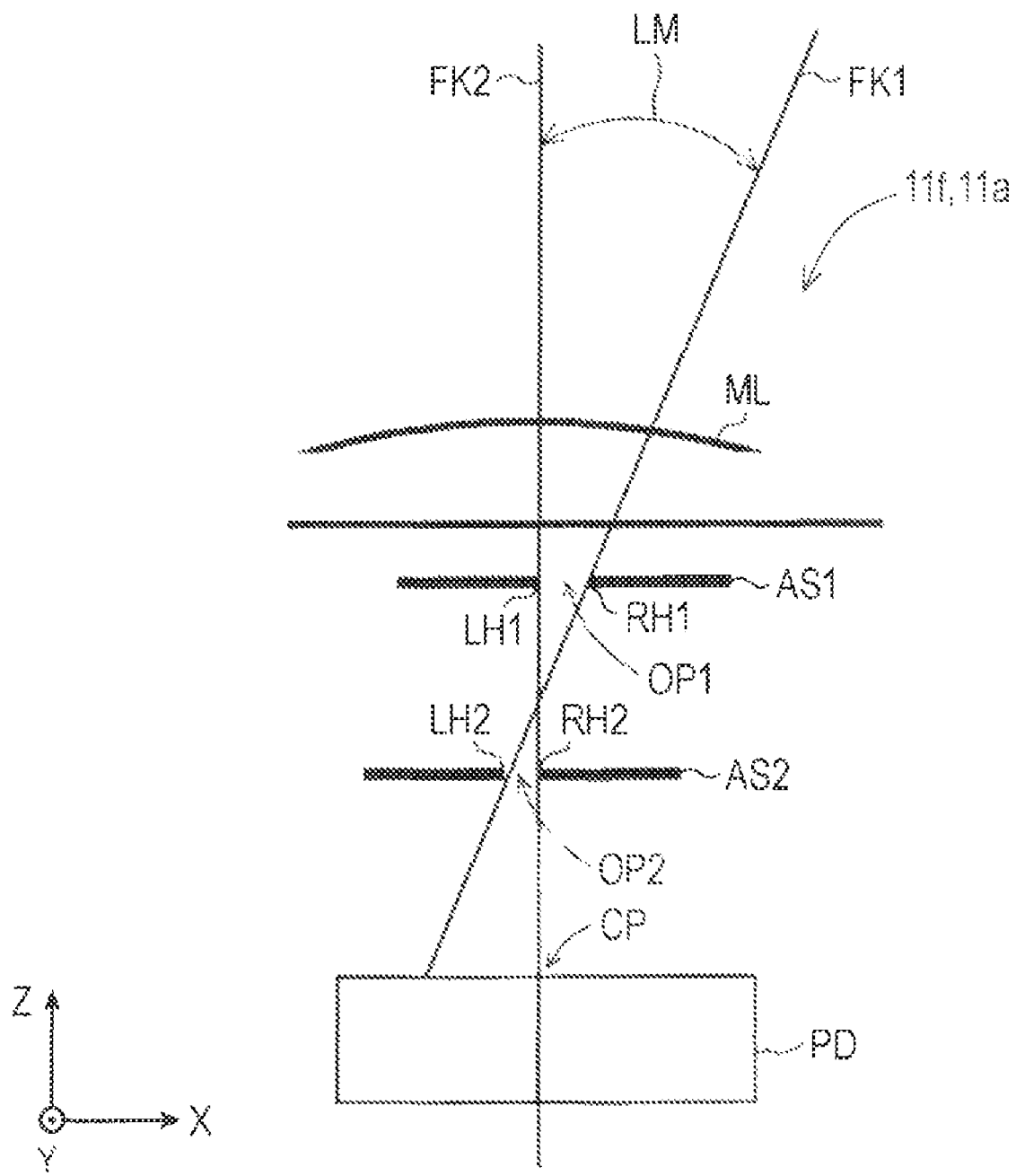
FIG. 16 shows a range in which a photoreceiving element of a first AF pixel can receive object light.
Figure 17:
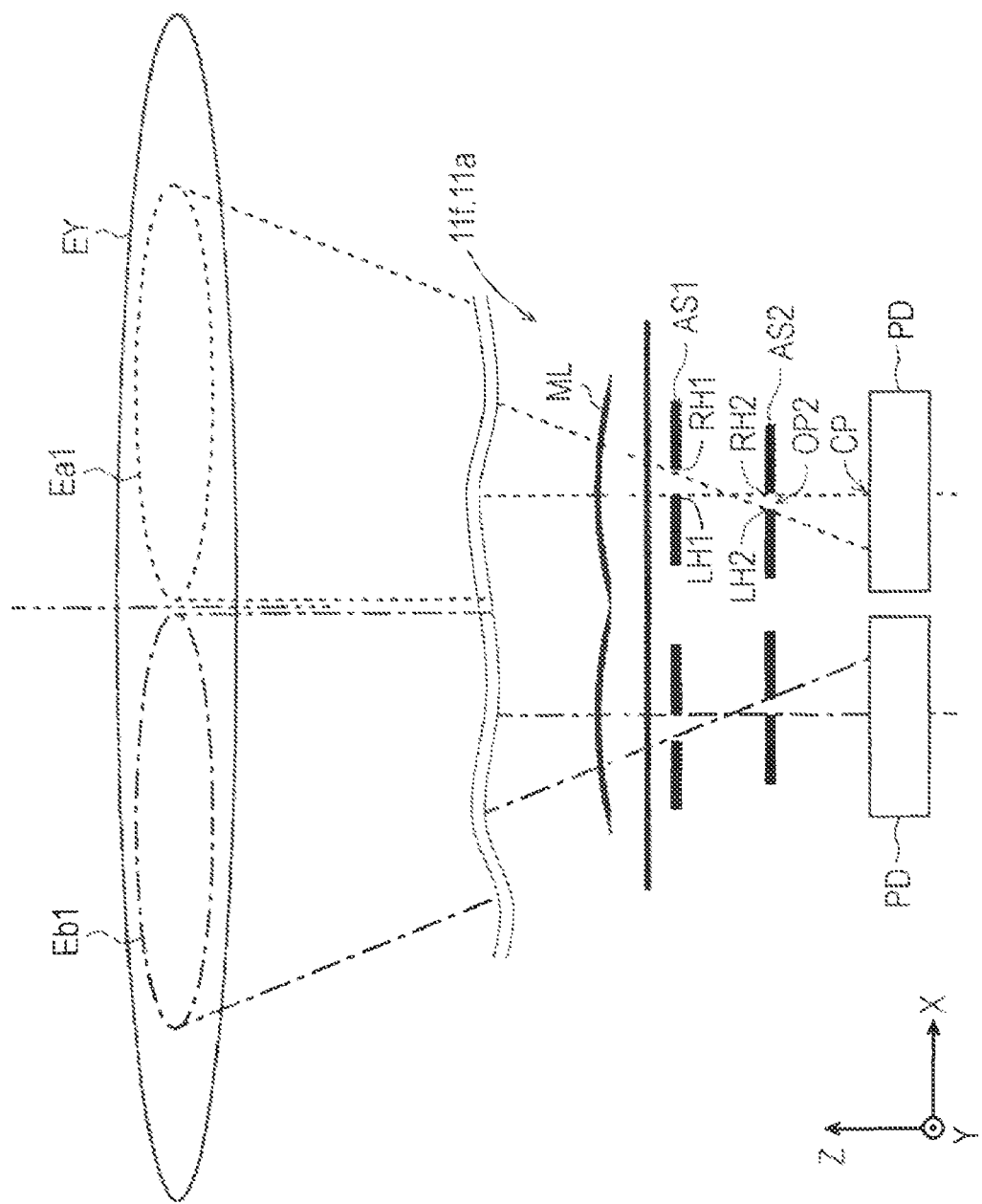
FIG. 17 shows the relationship between the photo-receiving range of each photoreceiving element in a pair of AF pixels and an area corresponding to the photo-receiving range in an exit pupil.

Furthermore, the two light-shielding plates AS1 and AS2 can also be expressed as having a function of limiting a range (also referred to as a "photo-receiving range") in which light can be received by the photoreceiving element PD. In the following, a description will be given of a case in which an AF pixel 11r having one light-shielding plate ASr is used as a comparative example and is contrasted with the AF pixel 11f of the present embodiment, and of a function of limiting the range in which light is received by the two light-shielding plates AS1 and AS2. FIG. 14 shows a range in which the photoreceiving element PD of the AF pixel 11r in the comparative example can receive object light. FIG. 15 shows the relationship between the photo-receiving range of the each photoreceiving element PD in the pair of AF pixels 11r in the comparative example and an area corresponding to the photo-receiving range in the exit pupil. FIG. 16 shows a range in which the photoreceiving element PD of the first AF pixel 11a can receive object light. FIG. 17 shows the relationship between the photo-receiving range of each photoreceiving element PD in the pair of AF pixels 11f and an area corresponding to the photo-receiving range in the exit pupil.

As shown in FIG. 14, in the AF pixel 11r (here, a first AF pixel 11ra) having only a light-shielding plate ASr, the photo-receiving range of the photoreceiving element PDr is a range indicated using the double-sided arrow LMr. More specifically, the photo-receiving range is a range defined by a plane Fr1 including the right side RHr of a light-shielding plate ASr and the left side LP of a photoreceiving element PDr, and a plane Fr2 including the left side LHr of the light-shielding plate ASr and the right side RP of the photoreceiving element PDr.

Here, the relationship between the photo-receiving range of each photoreceiving element PD of the first AF pixel 11ra and the second AF pixel 11rb which form a pair and the exit pupil EY is as shown in FIG. 15. More specifically, it is possible for the photoreceiving element PD of the first AF pixel lira to receive object light that has passed through an area Ea2 offset in a specific direction in the exit pupil EY. It is possible for the photoreceiving element PD of the second AF pixel 11rb to receive object light that has passed through an area Eb2 offset in a direction opposite to the specific direction. However, as shown in FIG. 15, most of the area Ea2 corresponding to the photo-receiving range of the first AF pixel 11ra overlaps with the area Eb2 corresponding to the photo-receiving range of the second AF pixel 11rb in the exit pupil EY. As a result, each photoreceiving element PD of the pair of AF pixels 11ra and 11rb receives much object light that has passed through a common portion of the exit pupil EY, and it is not possible to detect a phase difference in the light fluxes that have entered the pair of AF pixels 11ra and 11rb with high accuracy.

On the other hand, as shown in FIG. 16, in the AF pixel 11f (here, the first AF pixel 11a) of the present embodiment having the two light-shielding plates AS1 and AS2, the photo-receiving range of the photoreceiving element PD is a range indicated using the double-sided arrow LM. More specifically, the photo-receiving range is a range defined by a plane FK1 including the right side RH1 of the first opening OP1 (see FIG. 9) and the left side LH2 of the second opening OP2, and a plane FK2 including the left side LH1 of the first opening OP1 and the right side RH2 of the second opening OP2.

Here, the relationship between the photo-receiving range of each photoreceiving element PD of the first AF pixel 11a and the second AF pixel 11b which form a pair and the exit pupil EY is as shown in FIG. 17. It is possible for the photoreceiving element PD of the first AF pixel 11a to receive object light that has passed through an area Ea1 in the specific direction in the exit pupil EY, and it is possible for the photoreceiving element PD of the second AF pixel 11b to receive object light that has passed through an area Eb1 in a direction opposite to the specific direction in the exit pupil EY. That is, each photoreceiving element PD of the pair of AF pixels 11a and 11b receives object light that has passed through a different area (portion) in the exit pupil EY.

As described above, in the AF pixel 11f of the present embodiment, object light that enters from the direction opposite to the offset direction of the first opening OP1 in the first light-shielding plate AS1 is shielded by the light-shielding area of the second light-shielding plate AS2, and the photoreceiving range of the photoreceiving element PD is limited.

Figure 18:
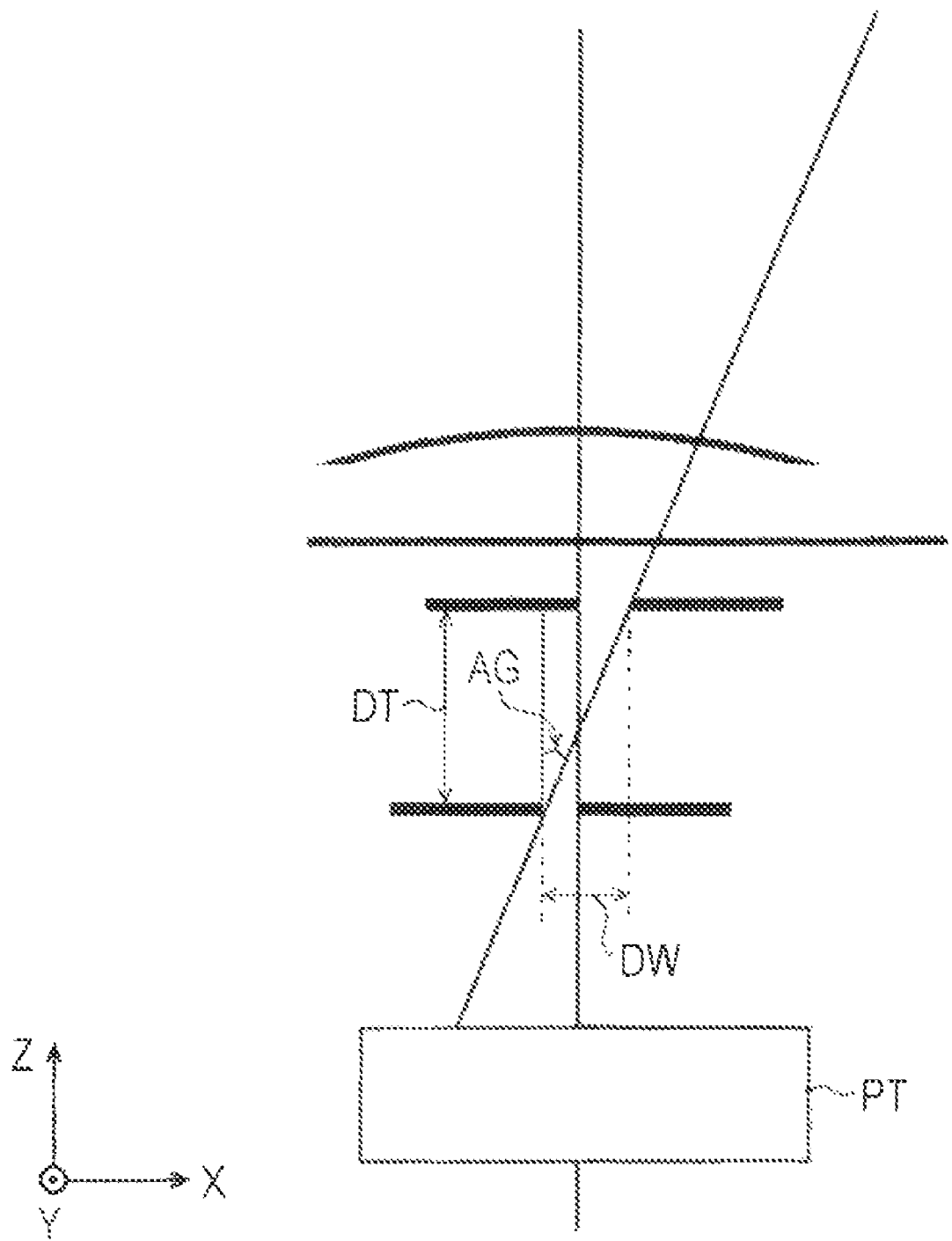
FIG. 18 shows a staring angle.

The photo-receiving range of the photoreceiving element PD in the AF pixel 11f can be expressed using a staring angle AG. FIG. 18 shows a staring angle AG.

More specifically, as shown in FIG. 18, the magnitude θ of the staring angle AG can be expressed as in Expression (1) by using a sum (sum of opening widths) DW of the width of the first opening OP1 with regard to the light-receiving target direction and the width of the second opening with regard to the light-receiving target direction, and a distance (also referred to as an "inter-light-shielding-plate distance") DT between the first light-shielding plate AS1 and the second light-shielding plate AS2.

$$\theta = \tan^{-1}\left(\frac{DW}{DT}\right) \quad (1)$$

As expressed in Expression (1), it is possible to adjust the staring angle AG, that is, the photo-receiving range of the photoreceiving element PD by changing the sum DW of the opening widths and/or the inter-light-shielding plate distance DT.

Second Embodiment

Figure 19:
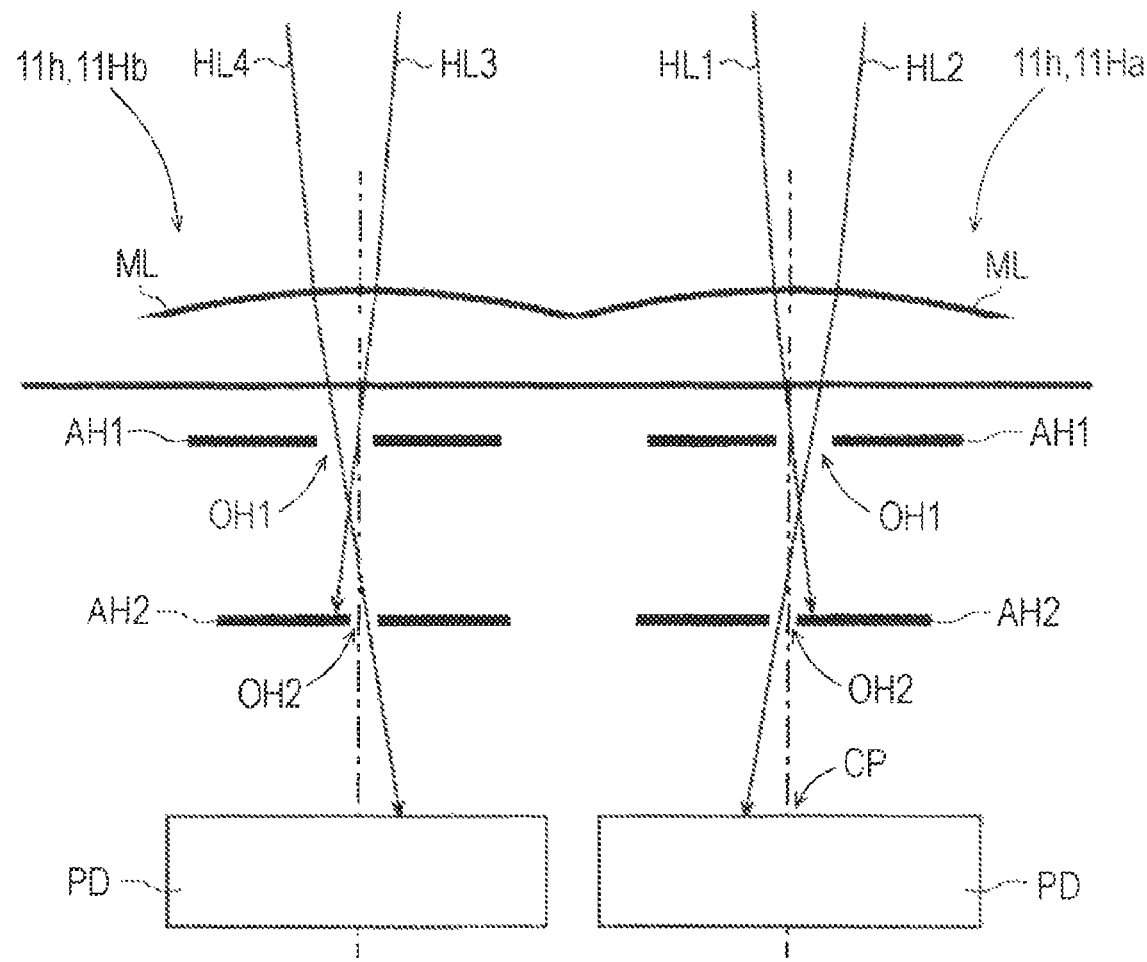
FIG. 19 shows an AF pixel according to a second embodiment of the present invention.
Figure 20:
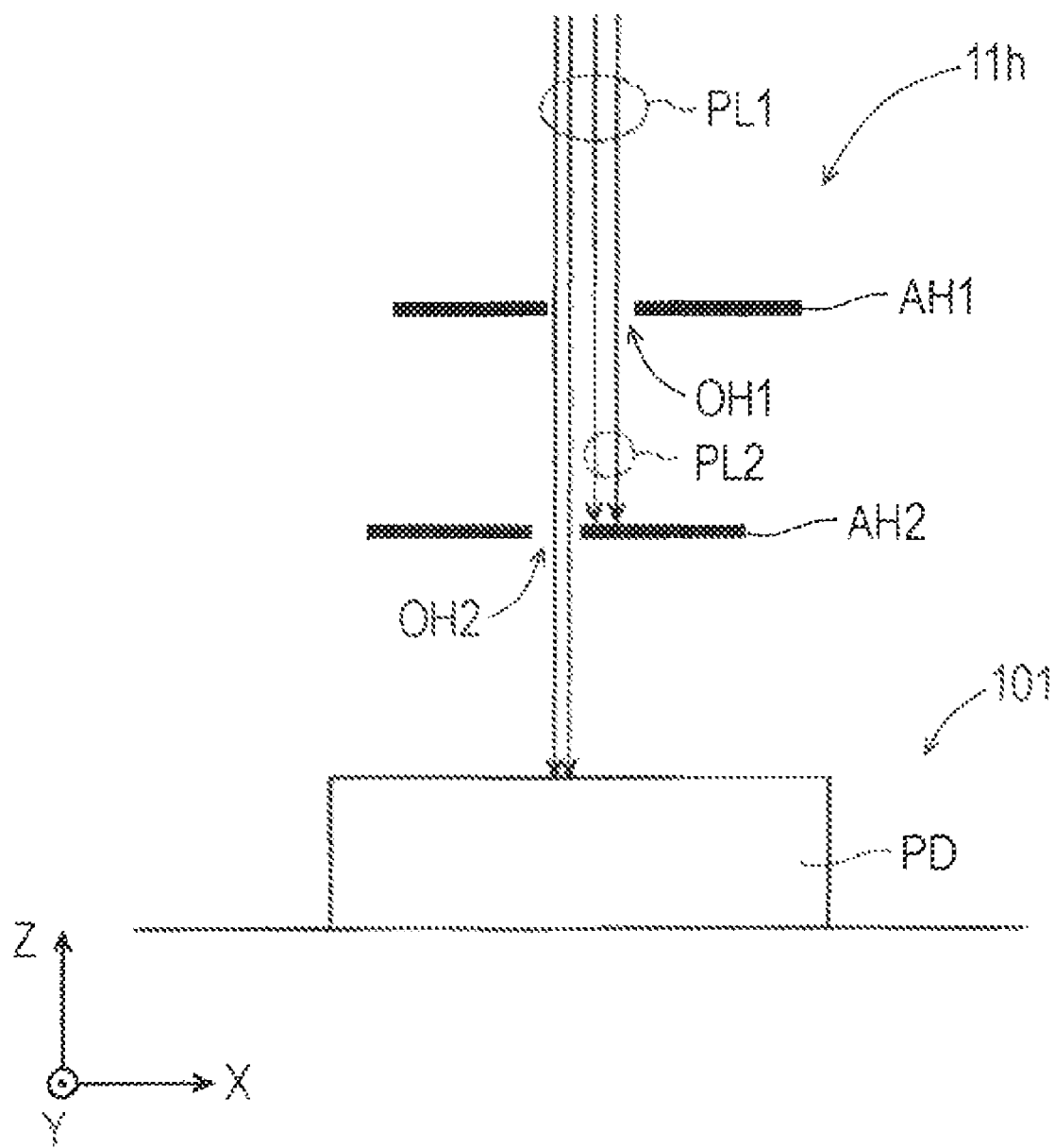
FIG. 20 shows the role of a second light-shielding plate.

Next, a second embodiment of the present invention will be described. In an image-capturing apparatus 1B according to a second embodiment, the relative positions of the openings OH1 and OH2 in the two light-shielding plates AH1 and AH2 differ from the relative positions of the openings OP1 and OP2 in the first embodiment. FIG. 19 shows an AF pixel 11h according to the second embodiment. FIG. 20 shows the role of a second light-shielding plate AH2. In FIG. 20, for simplification of the drawing, an AF pixel 11h in which the microlens ML is omitted is shown.

The image-capturing apparatus 1B according to the second embodiment has a configuration and functions (see FIGS. 1 to 5) that are almost identical to those of the image-capturing apparatus 1A according to the first embodiment except for the difference in the relative positions of the openings OH1 and OH2. The common components are designated with the same reference numerals, and the descriptions thereof are omitted.

As shown in FIG. 19, the AF pixels 11h (in more detail, a first AF pixel 11Ha and a second AF pixel 11Hb) of the image-capturing apparatus 1B have a first light-shielding plate AH1 having a first opening OH1 and a second light-shielding plate AH2 having a second opening OH2. The first opening OH1 is provided at a position offset in a specific direction (here, to the right) by using the center CP of the photoreceiving element PD as a reference. The second opening OH2 is provided at a position offset in a direction (here, to the left) opposite to the specific direction by using the center of the photoreceiving element PD as a reference.

Here, in the AF pixel 11f according to the first embodiment, the first opening OP1 and the second opening OP2 are provided at positions at which they do not overlap with each other in a case where the first opening OP1 and the second opening OP2 are projected in the Z-axis direction on the top surface of the photoreceiving element PD. In contrast, in the AF pixel 11h of the second embodiment, the first opening OH1 and the second opening OH2 are provided at positions at which they partially overlap with each other in a case where the first opening OH1 and the second opening OH2 are projected in the Z-axis direction on the top surface of the photoreceiving element PD.

More specifically, in the first AF pixel 11Ha, the first opening OH1 is provided in such a manner as to be offset in a specific direction by using the vicinity of the center of the photoreceiving element PD as a reference (origin), and the second opening OH2 is provided in such a manner as to be offset in a direction opposite to the specific direction by using the vicinity of the center of the photoreceiving element PD as a reference (origin). Furthermore, in the second AF pixel 11Hb, the first opening OH1 is provided in such a manner as to be offset in a direction opposite to the specific direction by using the vicinity of the center of the photoreceiving element PD as a reference, and the second opening OH2 is provided in such a manner as to be offset in the specific direction by using the vicinity of the center of the photoreceiving element PD as a reference.

In the first AF pixel 11Ha having the above-described configuration, the possibility is high that object light HL1 that has passed through an area in a direction opposite to the specific direction in the exit pupil within the object light that has passed through the first opening OH1 is shielded by the light-shielding area of the second light-shielding plate AH2. In comparison, object light HL2 that has passed through an area in the specific direction of the exit pupil within the object light that has passed through the first opening OH1 is received by the photoreceiving element PD.

Furthermore, in the second AF pixel 11Hb, the possibility is high that object light HL3 that has passed through an area in the specific direction in the exit pupil within the object light that has passed through the first opening OH1 is shielded by the light-shielding area of the second light-shielding plate AH2. In comparison, object light HL4 that has passed through an area in a direction opposite to the specific direction in the exit pupil within the object light that has passed through the first opening OH1 passes through the second opening OH2 and is received by the photoreceiving element PD.

As described above, in the AF pixel 11h, the possibility is high that object light that has entered from a direction opposite to the desired direction (the light-receiving target direction) in which light is received is shielded by the second light-shielding plate AH2. Therefore, in the object light that reaches the photoreceiving element PD, it is possible to increase the ratio of object light that passes through an area in the light-receiving target direction of the exit pupil.

In a case where a light beam perpendicular to the photoreceiving surface of the image-capturing element 101 is emitted from the photoreceiving surface of the image-capturing element 101 to the first light-shielding plate AH1, the second light-shielding plate AH2 can be expressed as being arranged at a position at which transmitted light PL2 in the light-receiving target direction within the light PL1 that that has been transmitted through the first opening OH1 is shielded (see FIG. 20).

Modification

The embodiments of the present invention have been described. However, the present invention is not limited to the above-described content.

For example, in each of the embodiments, the positions of the first openings OP1 and OH1 and the second openings OP2 and OH2 are defined by using the center CP of the photoreceiving element PD as a reference. Not being limited thereto, the positions of the first openings OP1 and OH1 and the second openings OP2 and OH2 may be defined by using the optical center of the microlens ML or the center of the AF pixel 11f as a reference (origin).

In each of the above-described embodiments, the second light-shielding plates AS2 and AH2 having the second opening OH2 have been adopted, but the embodiments are not limited thereto. More specifically, in a case where a light-shielding plate that does not have an opening is adopted as a second light-shielding plate and a light beam perpendicular to the photoreceiving surface of the image-capturing element 101 is emitted from the photoreceiving surface of the image-capturing element 101 to the first light-shielding plates AS1 and AH1, the second light-shielding plate may be arranged at a position at which light that has been transmitted through the first openings OP1 and OH1 is shielded. In more detail, light-shielding areas that exist on the side opposite to the light-receiving target direction in the second light-shielding plates AS2 and AH2 do not contribute to the light shielding of the object light that enters from the direction opposite to the light-receiving target direction. Therefore, light-shielding plates having a light-shielding area in only the light-receiving target direction may be adopted as the second light-shielding plates AS2 and AH2.

It should be understood by those skilled in the art that various modifications, combinations, sub-combinations and alterations may occur depending on design requirements and other factors insofar as they are within the scope of the appended claims or the equivalents thereof.

What is claimed is:

1. An image-capturing element comprising:
a pair of photoelectric conversion cells that pupil-divide object light in a first direction and in a second direction, the first direction and the second direction being different from each other, and that output a ranging signal,
wherein each of the pair of photoelectric conversion cells includes
a photoreceiving element configured to receive the object light and generate a ranging signal,
a first light-shielding layer having a first light-transmitting area, the first light-shielding layer being arranged above the photoreceiving element, and
a second light-shielding layer having a second light-transmitting area, the second light-shielding layer being arranged between the photoreceiving element and the first light-shielding layer, and
wherein the pair of photoelectric conversion cells includes
a first photoelectric conversion cell in which the first light-transmitting area is offset in the first direction on the first light-shielding layer and the second light-transmitting area is offset in the second direction on the second light-shielding layer, and
a second photoelectric conversion cell in which the first light-transmitting area is offset in the second direction on the first light-shielding layer and the second light-transmitting area is offset in the first direction on the second light-shielding layer, wherein
in the first photoelectric conversion cell, the first light-transmitting area is provided in such a manner as to be offset in the first direction by using the vicinity of the center of the photoelectric conversion cell as an origin, and the second light-transmitting area is provided in such a manner as to be offset in the second direction by using the vicinity of the center as an origin, and
in the second photoelectric conversion cell, the first light-transmitting area is provided in such a manner as to be offset in the second direction by using the vicinity of the center of the photoelectric conversion cell as an origin, and the second light-transmitting area is provided in such a manner as to be offset in the first direction by using the vicinity of the center as an origin.

2. The image-capturing element according to claim 1, wherein, in the first photoelectric conversion cell, the first light-transmitting area is provided in such a manner as to be offset in the first direction by using the center of the photoreceiving element as an origin, and the second light-transmitting area is provided in such a manner as to be offset in the second direction by using the center as an origin, and
in the second photoelectric conversion cell, the first light-transmitting area is provided in such a manner as to be offset in the second direction by using the center of the photoreceiving element as an origin, and the second light-transmitting area is provided in such a manner as to be offset in the first direction by using the center as an origin.

3. The image-capturing element according to claim 1, wherein each of the pair of photoelectric conversion cells further includes a lens configured to collect the object light above the first light-shielding layer.

4. An image-capturing element comprising:
a pair of photoelectric conversion cells that pupil-divide object light in a first direction and in a second direction, the first direction and the second direction being different from each other, and that output a ranging signal,
wherein each of the pair of photoelectric conversion cells includes
a photoreceiving element configured to receive the object light and generate a ranging signal;
a first light-shielding layer having a first light-transmitting area, the first light-shielding layer being arranged above the photoreceiving element;
a second light-shielding layer arranged between the photoreceiving element and the first light-shielding layer, and
wherein the pair of photoelectric conversion cells includes
a first photoelectric conversion cell in which the first light-transmitting area is offset in the first direction on the first light-shielding layer, and the second light-shielding layer is arranged at a position at which, when a light beam perpendicular to a photoreceiving surface of the image-capturing element is emitted to the first light-shielding layer, light of the light beam that has been transmitted through the first light-transmitting area is shielded, and
a second photoelectric conversion cell in which the first light-transmitting area is offset in the second direction on the first light-shielding layer, and the second light-shielding layer is arranged at a position at which, when a light beam perpendicular to the photoreceiving surface is emitted to the first light-shielding layer, light of the light beam that has been transmitted through the first light transparent area is shielded, wherein
in the first photoelectric conversion cell, the first light-transmitting area is provided in such a manner as to be offset in the first direction by using the vicinity of the center of the photoelectric conversion cell as an origin, and the second light-transmitting area is provided in such a manner as to be offset in the second direction by using the vicinity of the center as an origin, and
in the second photoelectric conversion cell, the first light transmitting area is provided in such a manner as to be offset in the second direction by using the vicinity of the center of the photoelectric conversion cell as an origin, and the second light-transmitting area is provided in such a manner as to be offset in the first direction by suing the vicinity of the center as an origin.

5. The image-capturing element according to claim 4, wherein the second light-shielding layer of the first photoelectric conversion cell is arranged at a position at which transmitted light in the first direction within the transmitted light is shielded, and
the second light-shielding layer of the second photoelectric conversion cell is arranged at a position at which transmitted light in the second direction within the transmitted light is shielded.

6. The image-capturing element according to claim 4, wherein each of the pair of photoelectric conversion cells further includes a lens configured to collect the object light above the first light-shielding layer.

7. An image-capturing apparatus comprising:
an image-capturing element,
wherein the image-capturing element includes
a pair of photoelectric conversion cells that pupil-divide object light in a first direction and in a second direction, the first direction and the second direction being different from each other, and that output a ranging signal, and
wherein each of the pair of photoelectric conversion cells includes
a photoreceiving element configured to receive the object light and generate a ranging signal,
a first light-shielding layer having a first light-transmitting area, the first light-shielding layer being arranged above the photoreceiving element, and
a second light-shielding layer having a second light-transmitting area, the second light-shielding layer being arranged between the photoreceiving element and the first light-shielding layer, and
wherein the pair of photoelectric conversion cells includes
a first photoelectric conversion cell in which the first light-transmitting area is offset in the first direction on the first light-shielding layer, and the second light-transmitting area is offset in the second direction on the second light-shielding layer, and
a second photoelectric conversion cell in which the first light-transmitting area is offset in the second direction on the first light-shielding layer and the second light-transmitting area is offset in the first direction on the second light-shielding layer, wherein
in the first photoelectric conversion cell, the first light-transmitting area is provided in such a manner as to be offset in the first direction by using the vicinity of the center of the photoelectric conversion cell as an origin, and the second light-transmitting area is provided in such a manner as to be offset in the second direction by using the vicinity of the center as an origin, and
in the second photoelectric conversion cell, the first light transmitting area is provided in such a manner as to be offset in the second direction by using the vicinity of the center of the photoelectric conversion cell as an origin, and the second light-transmitting area is provided in such a manner as to be offset in the first direction by suing the vicinity of the center as an origin.

8. An image-capturing apparatus comprising:
an image-capturing element,
wherein the image-capturing element includes
a pair of photoelectric conversion cells that pupil-divide object light in a first direction and in a second direction, the first direction and the second direction being different from each other, and that output a ranging signal,
wherein each of the pair of photoelectric conversion cells includes
a photoreceiving element configured to receive the object light and generate a ranging signal,
a first light-shielding layer having a first light-transmitting area, the first light-shielding layer being arranged above the photoreceiving element;
a second light-shielding layer having a second light-transmitting area, the second light-shielding layer being arranged between the photoreceiving element and the first light-shielding layer, and
wherein the pair of photoelectric conversion cells includes
a first photoelectric conversion cell in which the first light-transmitting area is offset in the first direction on the first light-shielding layer, and the second light-shielding layer is arranged at a position at which, when a light beam perpendicular to a photoreceiving surface of the image-capturing element is emitted to the first light-shielding layer, light of the light beam that has been transmitted the first light-transmitting area is shielded, and
a second photoelectric conversion cell in which the first light-transmitting area is offset in the second direction on the first light-shielding layer, and the second light-shielding layer is arranged at a position at which, when a light beam perpendicular to the photoreceiving surface is emitted to the first light-shielding layer, light of the light beam that has been transmitted the first light-transmitting area is shielded, wherein
in the first photoelectric conversion cell, the first light-transmitting area is provided in such a manner as to be offset in the first direction by using the vicinity of the center of the photoelectric conversion cell as an origin, and the second light-transmitting area is provided in such a manner as to be offset in the second direction by using the vicinity of the center as an origin, and
in the second photoelectric conversion cell, the first light transmitting area is provided in such a manner as to be offset in the second direction by using the vicinity of the center of the photoelectric conversion cell as an origin, and the second light-transmitting area is provided in such a manner as to be offset in the first direction by suing the vicinity of the center as an origin.

* * * * *